(12) United States Patent
Kurihara

(10) Patent No.: US 6,516,020 B1
(45) Date of Patent: Feb. 4, 2003

(54) CORRELATOR AND DESPREADING CODE SWITCHING METHOD

(75) Inventor: Naoyuki Kurihara, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/212,587

(22) Filed: Dec. 16, 1998

(30) Foreign Application Priority Data

Dec. 20, 1997 (JP) ............................................. 9-365288
Aug. 26, 1998 (JP) ........................................... 10-240302

(51) Int. Cl.[7] ............................................. H04B 1/707
(52) U.S. Cl. ...................... 375/142; 375/143; 375/150; 375/152; 375/343; 370/325; 708/314
(58) Field of Search ................................. 375/142, 143, 375/150, 152, 343; 370/320, 325, 335, 342, 441, 479; 708/322, 314

(56) References Cited

U.S. PATENT DOCUMENTS

| 5,177,766 | A |   | 1/1993 | Holland et al. |
|-----------|---|---|--------|----------------|
| 5,546,424 | A |   | 8/1996 | Miyake |
| 5,812,593 | A | * | 9/1998 | Kaku ........................... 370/342 |
| 5,862,172 | A | * | 1/1999 | Sugita et al. ................. 370/335 |
| 5,960,033 | A | * | 9/1999 | Shibano et al. .............. 327/551 |
| 6,181,733 | B1 | * | 1/2001 | Shinde ........................ 375/152 |
| 6,333,925 | B1 | * | 12/2001 | Tsubouchi et al. .......... 370/335 |

* cited by examiner

Primary Examiner—Stephen Chin
Assistant Examiner—Dac V. Ha
(74) Attorney, Agent, or Firm—Greenblum & Bernst P.L.C.

(57) ABSTRACT

Despreading codes are switched at effective timings to perform despreading calculations by providing a rate difference between the first clock signal to input a spread signal to be subjected to the correlation detection to a data holding section and the second clock signal to switch a despreading code used to detect the correlation of the spread signal held in the data holding section.

7 Claims, 19 Drawing Sheets

CORRELATOR AND DESPREADING CODE SWITCHING METHOD

BACKGROUND OF THE INVENTION

1. Field of the Invention

The present invention relates to a correlator and despreading code switching method applicable to a matched filter used in a synchronization acquisition in a spread spectrum communication system.

2. Description of the Related Art

A configuration of a conventional matched filter is explained with FIG. 1. The matched filter illustrated in FIG. 1 is an example of a matched filter for 5 times spreading with FIR digital filter.

The matched filter includes shift register 8 composed of reception signal input terminal 1, clock signal input terminal 2 and flip-flops 3 to 7, multipliers 9 to 13, adder 14, output terminal 15, hold signal input terminal 16, despreading code input terminal 17, load signal input terminal 18, calculation register composed of flip-flops 19 to 23, and write shift register 30 composed of flip-flops 25 to 29.

A digital signal that is generated by sampling analogue signals (for example, spread spectrum signal) at a sampling frequency of 4.096 MHz is input to reception signal input terminal 1. In addition, the digital signal is a signal of 6 bits synchronized with a signal input from clock signal input terminal 2. The digital signal is input to flip-flop 3, then shifted toward flip-flop 7 in synchronism with a clock. Multipliers 9 to 13 are multipliers of 6 bits by 1 bit, and output signals of 7 bits. Multiplier 9 multiplies an output signal from flip-flop 3 (6 bits) by an output signal from flip-flop 19 (1 bit) from among output signals from calculation register 24. Multipliers 10 to 13 multiply respectively output signals from flip-flops 4 to 7 by output signals from flip-flops 20 to 23 in calculation register 24. Adder 14 adds outputs from multipliers 9 to 13 to output from output terminal 15.

A multiplication procedure in a despreading code switching is explained below with reference to FIG. 2.

In a state before a despreading code switching, it is assumed that output signals from flip-flops 29 to 25 in write shift register 30 are respectively despreading code sequences C-5, C-4, C-3, C-2 and C-1 and that output signals from flip-flops 23 to 19 in calculation register 24 are respectively despreading code sequences C-5, C-4, C-3, C-2 and C-1.

First, the multiplication procedure before the despreading code switching is explained.

A digital signal of first sampling data D0 input to reception signal input terminal 1 is input to flip-flop 3. Multiplier 9 multiplies the sampling data D0 by despreading code C-1. Accordingly multiplier 9 outputs an output signal indicative of a value of D0 ×C-1.

When a digital signal of second sampling data D1 that is input to reception signal input terminal 1 in synchronism with a clock input from clock signal input terminal 2 is input to flip-flop 3, first sampling data D0 is input to flip-flop 4. As a result, multiplier 9 multiplies second sampling data D1 by despreading code C-1, while multiplier 10 multiplies first sampling data D0 by despreading code C-2. Accordingly, multiplier 9 outputs an output signal indicative of a value of D1×C-1, while multiplier 10 outputs an output signal indicative of a value of D0×C-2.

Then, the same processing as described above is repeated until fourth sampling data D3 is input.

When a digital signal of fifth sampling data D4 is input to reception signal input terminal 1 in synchronism with a clock input from clock signal input terminal 2, first to fifth sampling data D0 to D4 are respectively input to flip-flops 7 to 3. Accordingly, multiplier 9 outputs a multiplication result indicative of a value of D4×C-1, multiplier 10 outputs a multiplication result indicative of a value of D3×C-2, multiplier 11 outputs a multiplication result indicative of a value of D2×C-3, multiplier 12 outputs a multiplication result indicative of a value of D1×C-4, and multiplier 13 outputs a multiplication result indicative of a value of D0×C-5.

According to the above processing, all multiplication needed to obtain the correlation value of digital signals of first five sampling data D0 to D4 respectively with despreading code sequences C-5, C-4, C-3, C-2 and C-1 has been performed. Adder 14 adds a multiplication result from each multiplier, and outputs correlation result H(4) from output terminal 15.

As a result, all despreading calculations needed to obtain the correlation value of digital signals of five sample data D0, D1, D2, D3 and D4 respectively with 5 bits despreading code sequences C-5, C-4, C-3, C-2 and C-1 have been performed.

Next, processing for a despreading code switching in the matched filter is explained. When hold signal input terminal 16 is set at a low level, C0, C1, C2, C3 and C4 input from despreading code input terminal 17 is sequentially input to flip-flops 25 to 29 composing the write shift register in synchronism with the clock input from clock signal input terminal 2. Further, when a signal input from load signal input is a low level, despreading code sequences C0, C1, C2, C3 and C4 in write register 30 are loaded in calculation register 24 in synchronism with the clock input from clock signal input terminal 2.

Since the clock for the despreading calculation and the clock to load the despreading code are both synchronized with the clock input from clock signal input terminal 2, the clocks are affected by delay in a circuit internal, which changes depending on diffusion processes of semiconductor, environment temperature, supply voltage, etc., thereby making it impossible to specify which moves faster logically.

Hence, when a digital signal of sixth sampling data D5 is input to reception signal input terminal 1, it is not possible to specify the despreading code sequences to be used in the despreading calculation, i.e., to specify which despreading code sequences are used for the despreading calculation, C-5, C-4, C-3, C-2 and C-1 that are the despreading code sequences before the switch, or C0, C1, C2, C3 and C4 that are the despreading code sequences after the switching.

Next, the explanation below describes about an calculation processing after the despreading code sequences C0, C1, C2, C3 and C4 are loaded.

When a digital signal of seventh sampling data D6 is input to reception signal input terminal 1 in synchronism with the clock input from clock signal input terminal 2, third to seventh sampling data D2 to D6 are respectively input to flip-flops 7 to 3. Accordingly, multiplier 9 outputs a multiplication result indicative of a value of D6×C4, multiplier 10 outputs a multiplication result indicative of a value of D5×C3, multiplier 11 outputs a multiplication result indicative of a value of D4×C2, multiplier 12 outputs a multiplication result indicative of a value of D3×C1, and multiplier 13 outputs a multiplication result indicative of a value of D2×C0.

According to the above processing, all multiplication needed to obtain the correlation value of digital signals of five sampling data D2 to D6 respectively with despreading code sequences C0, C1, C2, C3 and C4 has been performed. Adder 14 adds a multiplication result from each multiplier, and outputs correlation result H(6) from output terminal 15.

As a result, all despreading calculations needed to obtain the correlation value of digital signals of five sample data D2, D3, D4, D5 and D6, which are 2 samples later than five sample data D0, D1, D2, D3 and D4, respectively with 5 bits despreading code sequences C0, C1, C2, C3 and C4 have been performed. Then, the same processing is repeated.

However, in the configuration of the conventional matched filter described above, as described in the conventional case, the clock with which the despreading calculation register in the matched filter is synchronized and the clock with which the despreading code switching is synchronized are the same, thereby remaining a problem that it is difficult to decide which codes before the switching or after the switching are used in the system that requires a successive correlation detection when the despreading codes are switched.

SUMMARY OF THE INVENTION

The present invention is intended to solve the above-mentioned conventional problem. The object of the present invention is to provide a correlator and despreading code switching method capable of detecting the correlation of received signals successively without applying wrong codes when the despreading code is switched, by differing timings of the clock with which the despreading calculation processing in the matched filter is synchronized and the clock with which the despreading code switching processing is synchronized.

The present invention provides a constitution where it is possible to detect the correlation of received signals successively without applying wrong codes, by differing timings of the clock with which the despreading calculation processing in the matched filter is synchronized and the clock with which the despreading code switching processing is synchronized.

The present invention provides an effect that it is possible to perform calculations with specified despreading codes successively without applying wrong codes in depsreading digital signals with a plurality of despreading codes, by differing timings of a despreading calculation of digital signals and the despreading code switching.

DETAILED DESCRIPTION OF THE PREFERRED EMBODIMENTS (Embodiment 1)

Hereinafter, Embodiment 1 of the present invention is explained with reference to drawings.

Figure 3:
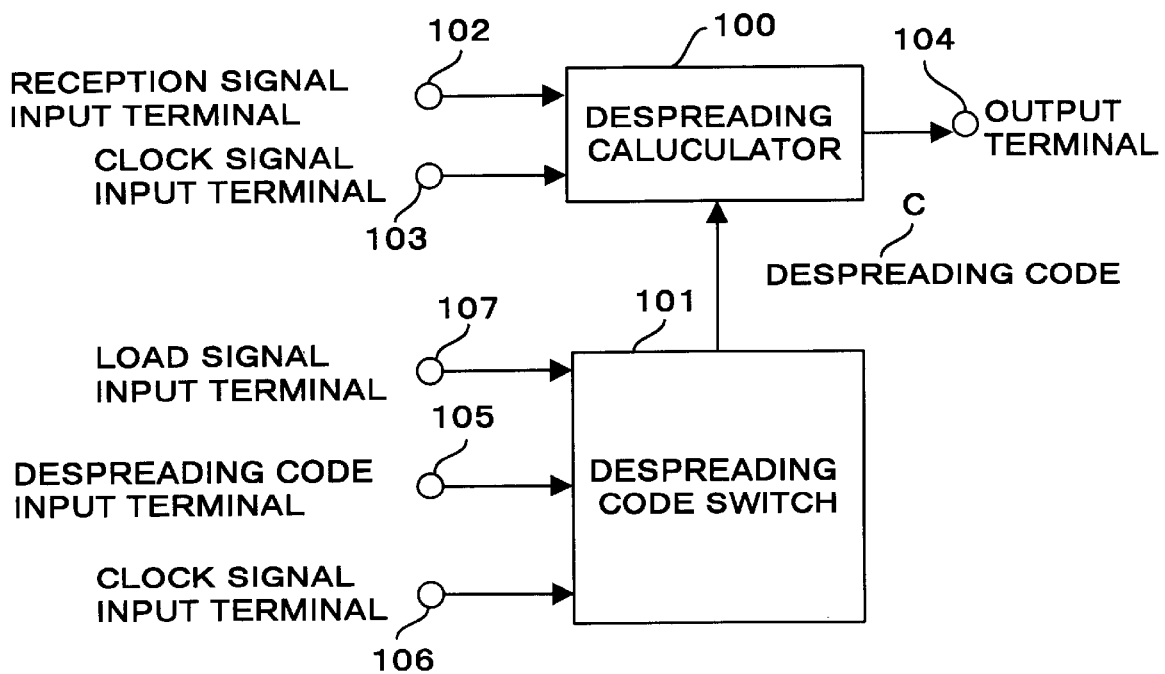
FIG. 3 is a configuration diagram of a matched filter according to Embodiment 1 of the present invention.

FIG. 3 illustrates a configuration of a despreading code switching section of the matched filter according to Embodiment 1 of the present invention. The matched filter of Embodiment 1 comprises despreading calculator 100 for performing a despreading calculation to multiple a spread signal by a despreading code, and despreading code switch 101 for performing a switching of a despreading code to be provided to despreading calculator 100.

In despreading calculator 100, spread signals composed of spread digital signals are input to reception signal input terminal 102, and a first clock to provide a despreading calculation timing is input to clock signal input terminal 103. In addition, despreading calculator 100 outputs a despreading calculation result from output terminal 104.

In dispersing code switch 101, despreading code sequences are input to despreading code input terminal 105, a second clock to provide a despreading code switching timing is input to clock signal input terminal 106, further a load signal to load switched despreading code 108 to despreading calculator 100 is input to load signal input terminal 107.

Figure 4:
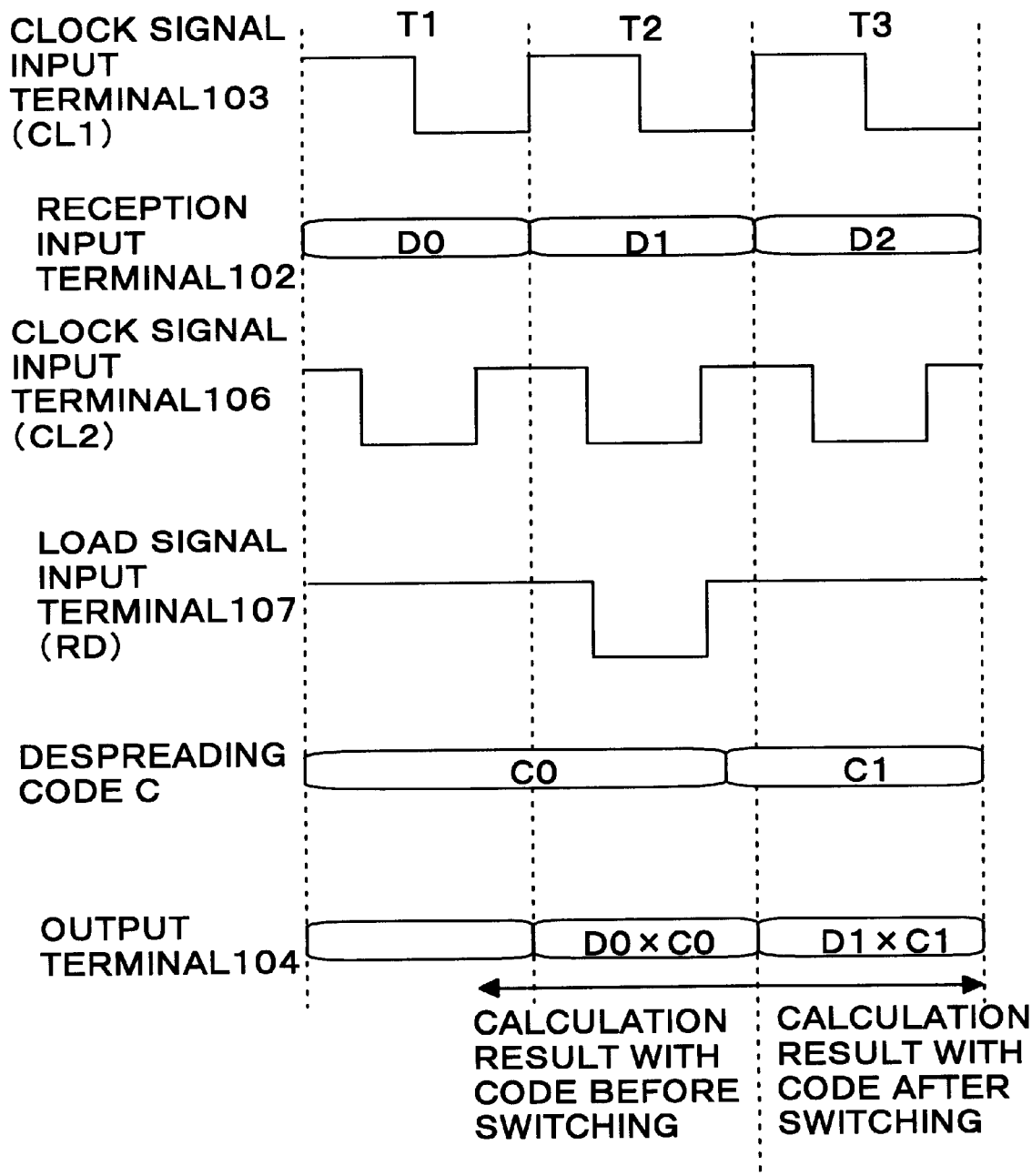
FIG. 4 is a timing diagram to explain a despreading code switching procedure in the matched filter illustrated in FIG. 3.

The explanation below describes about the despreading code switching processing in the matched filter according to this embodiment configured as described above. FIG. 4 is a time chart for the despreading code switching processing in this embodiment. As illustrated in FIG. 4, by differing phases of the first clock CL1 to provide the despreading calculation timing and the second clock CL to provide the despreading code switching timing, it is set that the rise edge of the second clock CL2 is always different from that of the first clock CL1.

Figure 1:
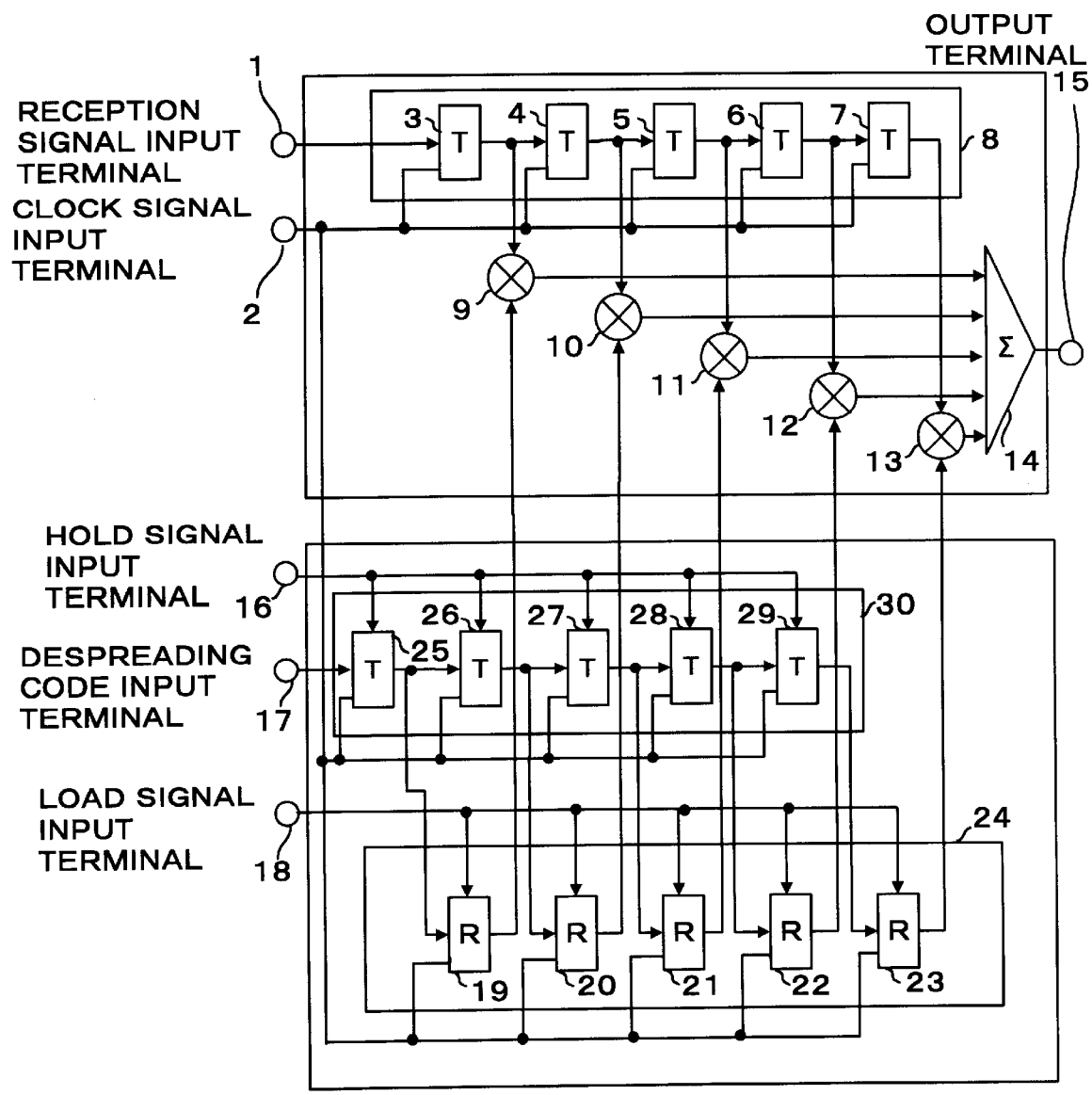
FIG. 1 is a configuration diagram of a conventional matched filter.
Figure 2:
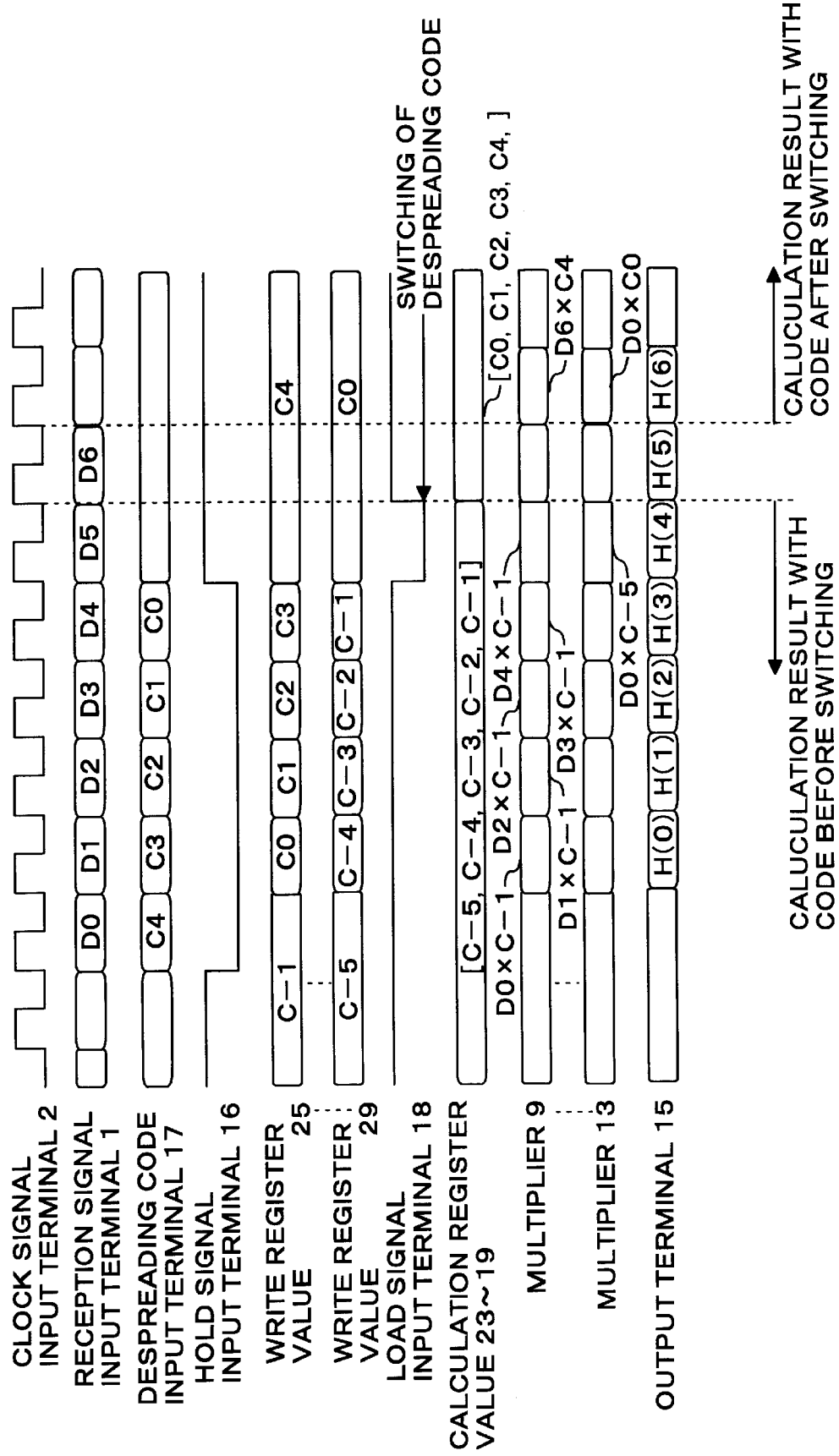
FIG. 2 is a timing diagram to explain a despreading code switching procedure in the matched filter illustrated in FIG. 1.

Hereinafter, the despreading code switching processing is specifically explained according to the time chart in FIG. 2.

Via reception signal input terminal 101, at time spread digital signal D0 is input to despreading calculator 100 in synchronism with the first clock CL1, and at time T2, spread digital signal D1 is input to despreading calculator 100 in synchronism with the first clock CL1.

In addition, at time T2, in synchronism with the first clock CL1, the despreading calculation of digital signal D0 that was input at time T1 with despreading code C0 input from despreading code switch 101 is performed, and a calculation result of C0×D0 is output from output terminal 104.

At time T3, in synchronism with the first clock CL1 input from clock signal input terminal 103, spread digital signal D2 is input to despreading calculator 100 via reception signal input terminal 102. Then, in synchronism with the first clock CL1 input from clock signal input terminal 103, the despreading calculation of digital signal D1 that was input at time T2 with despreading code C1 after a switching input from despreading code switch 101 is performed, and a calculation result of C1×D1 is output from output terminal 104.

At this time, despreading code C to be used in the depsreading calculation in despreading calculator 100 is switched by the load signal RD that is in synchronism with the second clock CL2. That is, the despreading code is switched from C0 to C1 by the load signal RD. The load signal RD is synchronized with the rising timing of the second clock CL2 that rises after the first clock CL1 to provide the despreading calculation timing has risen.

As a result, updated despreading code C is, within the range to be reflected in a next despreading calculation, provided to despreading calculator 100 with a different timing from the first clock CL1.

According to Embodiment 1 described above, it is possible to provide, within the range to be reflected in a next despreading calculation, updated despreading code C to despreading calculator 100 with a different timing from the first clock CL1, thereby making it possible to perform calculations successively with specified despreading codes without applying wrong codes in the system requiring successive correlation detection.

(Embodiment 2)

Figure 5:
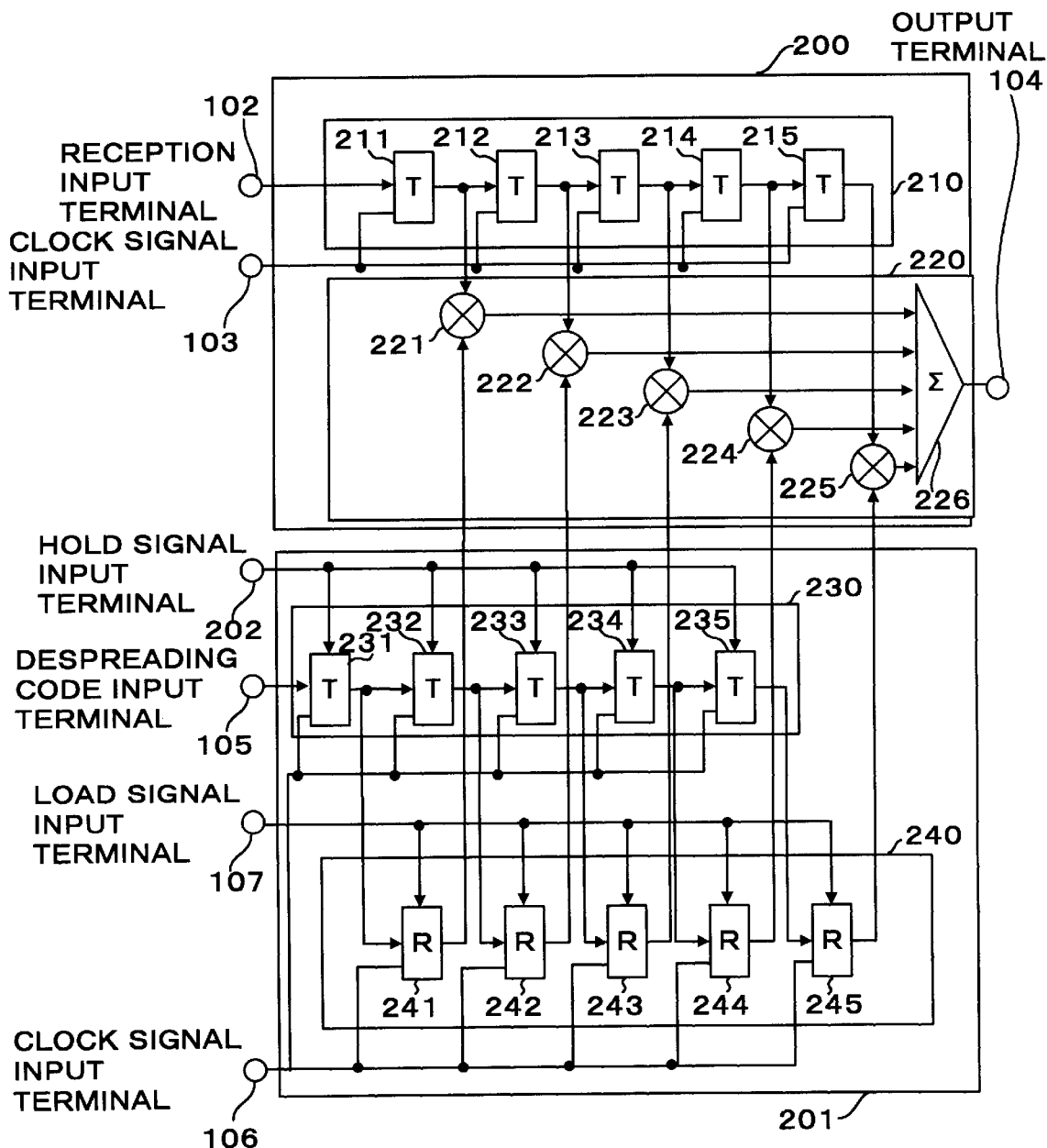
FIG. 5 is a configuration diagram of a matched filter according to Embodiment 2 of the present invention.

FIG. 5 is a diagram illustrating a configuration of a matched filter for 5 times spreading according to Embodiment 2 of the present invention. The matched filter in Embodiment 2 is an practical example of the configuration of the matched filter in Embodiment 1. The same sections in FIG. 4 as those of the matched filter in FIG. 3 have the same symbols.

In despreading calculator 200, spread signals composed of digital spread signals are input to reception signal input terminal 102, the first clock CL1 to provide the despreading calculation timing is input to clock signal input terminal 103, and a despreading calculation result is output from output terminal 104.

This despreading calculator 200 comprises in its inside shift register 210 to store spread signals, and despreading calculation section 220 to perform despreading calculations of the spread signals stored in shift register 210 with despreading codes input from despreading code switch 201.

Shift register 210 is composed of a plurality of flip-flops 211 to 215 that are serially coupled. A spread signal input from reception signal input terminal 102 is provided to flip-flop 211 of the first stage, and the first clock CL1 input from clock signal input terminal 103 is provided to each of flip-flops 211 to 215 in parallel.

Despreading calculation section 220 comprises a plurality of multipliers 221 to 225 corresponding to the number of spread signals that shift register is capable of holding, and adder 226 to output a sum of outputs from all multipliers 221 to 225 to output terminal 104 as a correlation signal.

On the other hand, in despreading code switch 201, despreading code sequences are input to despreading code input terminal 105, the second clock CL2 to provide a timing to switch a despreading code is input to clock signal input terminal 106, the load signal to load a switched despreading code to despreading calculator 200 is input to load signal input terminal 107, further a hold signal is input to hold signal input terminal 202.

This despreading code switch 201 comprises in its inside write shift register 230 to hold despreading code sequences to be provided to despreading code input terminal 105, calculation register 240 to which despreading codes to be output to despreading calculation section 220 for the despreading calculation are loaded from write shift register 230.

Write shift register 230 is composed or a plurality of flip-flops 231 to 235 that are serially coupled. A despreading code input from despreading code input terminal 105 is provide to flip-flop 231 of the first stage, and the second clock CL2 input from clock signal input terminal 106 is provided to each of flip-flops 231 to 235 in parallel. A hold signal is provided to each of flip-flops 231 to 235 from hold signal input terminal 202.

Calculation register 240 is composed of a plurality of flip-flops 241 to 245 corresponding to the number of flip-flops 231 to 235 in write shift register 230. To each of flip-flops 241 to 245, the despreading code is input respectively from corresponding flip-flops 231 to 235 in write shift register, the second clock CL2 is input from clock signal input terminal 106n in parallel, further a new despreading code is input from write shift register 230 by the load signal.

Figure 6:
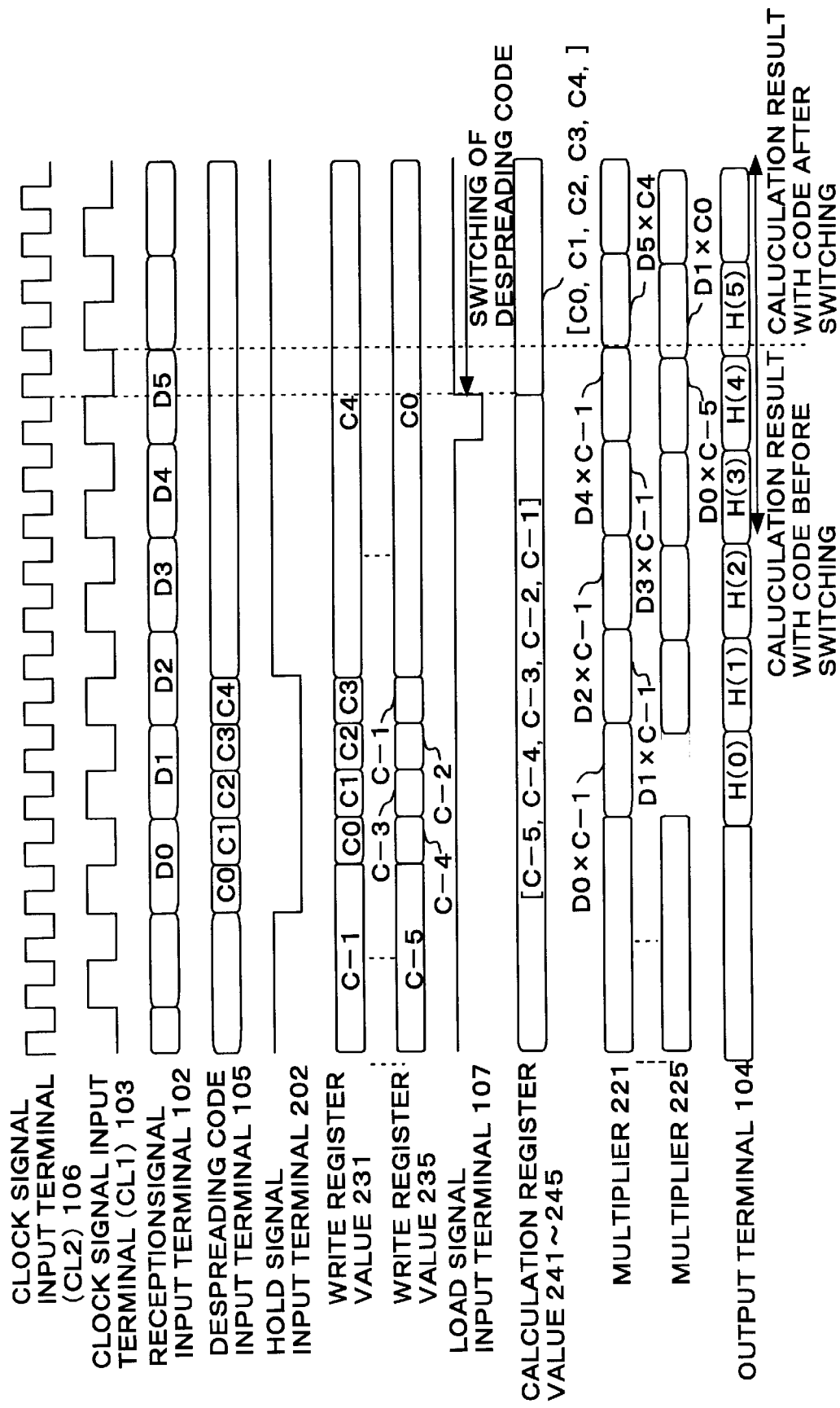
FIG. 6 is a timing diagram to explain a despreading code switching procedure in the matched filter illustrated in FIG. 5.

Processing in this embodiment configured as described above is explained with reference to FIG. 6.

In this embodiment, 4.096 MHz clock is input to clock signal input terminal 103 in despreading calculator 200 as the first clock CL1, and 8.192 MHz clock that has twice frequency that of the first clock is input to clock signal input terminal 106 in despreading code switch 201 as the second clock CL2.

A digital signal is input to reception signal input terminal 102. The digital signal is generated by sampling analogue spread spectrum signals at a sampling frequency of 4.096 MHz, and assumed, for example, to be a 6 bits signal.

A digital signal hold in flip-flop 211 of the first stage of shift register 210 is transferred to latter stages sequentially in synchronism with the first clock CL1. Each output from each flip-flops 211 to 215 is respectively provided to corresponding multipliers 221 to 225.

In multipliers 221 to 225, the multiplication of each output signal from flip-flops (6 bits) by each output signal from shift register 240 is performed in parallel. Adder 226 adds the output signals from these multipliers 221 to 225 to output to output terminal 104.

The multiplication processing is explained in detail.

First, the multiplication before the despreading code switching is explained.

In a state before the despreading code switching, it is assumed that output signals from flip-flops 231 to 235 in write shift register are despreading code sequences C-5, C-4, C-3, C-2 and C-1, and output signals from flip-flops 241 to 245 composing calculation register 240 are the despreading code sequences C-5, C-4, C-3, C-2 and C-1.

In this state, when a digital signal of the first sampling data D0 is input to flip-flop 211 in synchronism with the first clock CL1, the multiplication of the sampling data D0 by despreading code C-1 is performed in multiplier 221 and an output signal indicative of a value of D0×C-1 is output from multiplier 221.

At the next clock timing of the first clock CL1, a digital signal of the second sampling data D0 is input to flip-flop 211, and the first sampling data D0 is input to flip-flop 212. The sampling data D1 and D0 held in flip-flops 211 and 212 are multiplied by despreading code C-1 or C-2 respectively in corresponding multipliers 221 and 222. An output signal indicative of a value of D1×C-1 is output from multiplier 221, while an output signal indicative of a value of D0×C-2 is output from multiplier 222. The same processing is repeated until the fifth sampling data D4 are input.

According to the above processing, all multiplication needed to obtain the correlation value of digital signals of first five sampling data D0 to D4 respectively with despreading code sequences C-5, C-4, C-3, C-2 and C-1 has been performed. Adder 226 adds a multiplication result from each multiplier, and outputs correlation result H(4) from output terminal 104.

Thus, all despreading calculations needed to obtain the correlation value of digital signals of five sample data D0, D1, D2, D3 and D4 respectively with 5 bits despreading code sequences C-5, C-4, C-3, C-2 and C-1 have been performed.

On the other hand, despreading code switch 201 performs a despreading code switching as below.

When a hold signal input from hold signal input terminal 202 is a low level, in synchronism with the second clock CL2 input from clock signal input terminal 106, C0, C1, C2, C3 and C4 are input to write shift register 230 sequentially from despreading code input terminal 105. Thus, the despreading code sequences held in write shift register 230 are updated with the second clock CL2 that has twice frequency that of the first clock CL1. Then, a load signal input from load signal input terminal 107 is a low level, in synchronism with the second clock CL23, at the time of a decay edge of the first clock CL1 in despreading calculator 100, the despreading code sequences C0, C1, C2, C3 and C4 in write shift register 230 are loaded in calculation register 240. The despreading code sequences C0, C1, C2, C3 and C4 loaded in calculation register 240 are provided to multipliers 221 to 225 in despreading calculator 100 to be used in the despreading calculation.

Thus, the load signal is the low level, in synchronism with the second clock CL2 and at a different timing from the first clock CL1 for the depsreading calculation, the despreading code sequences C0, C1, C2, C3 and C4 are loaded in calculation register 240.

Accordingly, in this embodiment, the despreading code sequences C0, C1, C2, C3 and C4 are loaded in calculation register 240 in synchronism with the second clock CL2 that has a twice frequency that of the first clock CL1 for the despreading calculation timing, thereby making it possible to perform calculations successively with specified despreading codes without using wrong codes in the system requiring successive correlation detentions.

(Embodiment 3)

Figure 7:
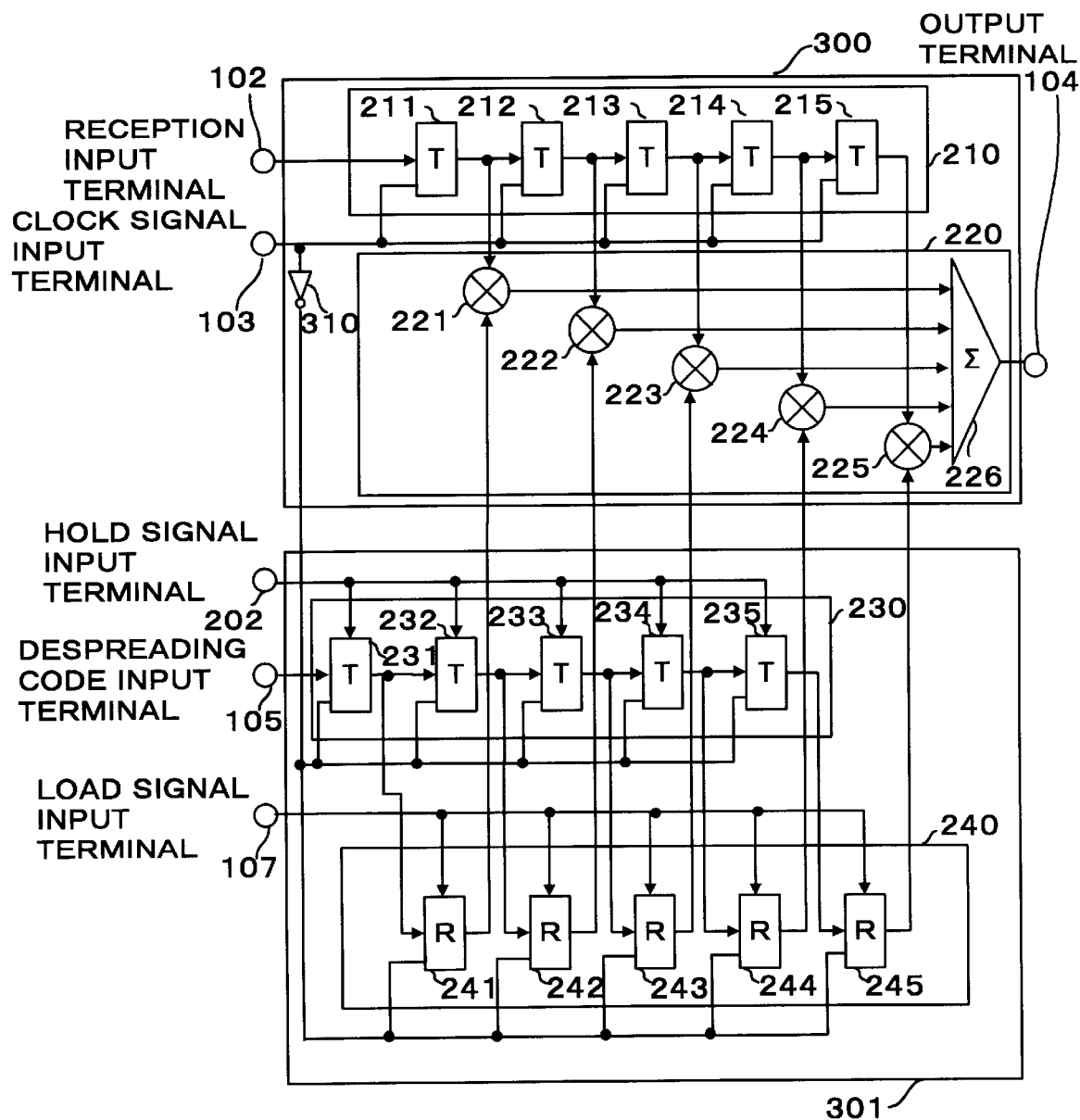
FIG. 7 is a configuration diagram of a matched filter according to Embodiment 3 of the present invention.

FIG. 7 is a circuit diagram illustrating a configuration of a matched filter according to Embodiment 3 of the present invention. The matched filter in Embodiment 3 has the almost same configuration as that in Embodiment 2, except that an inverse signal of the first clock CL1 described above is used as the second clock CL2. In addition, sections having the same functions as those of the matched filter in Embodiment 2 illustrated in FIG. 5 are assigned the same symbols as those in FIG. 5 to omit the redundancy.

Despreading calculator 300 provided in a matched filter in this embodiment comprises inverter 310 that inverses phases of the first clock CL1 to be input to clock signal input terminal 103 to output to despreading code switch 301 as the second clock CL2. Then, despreading code switch 301 receives an output signal from inverter 310 as the second clock CL2 to provide to write register 230 and calculation register 240.

Figure 8:
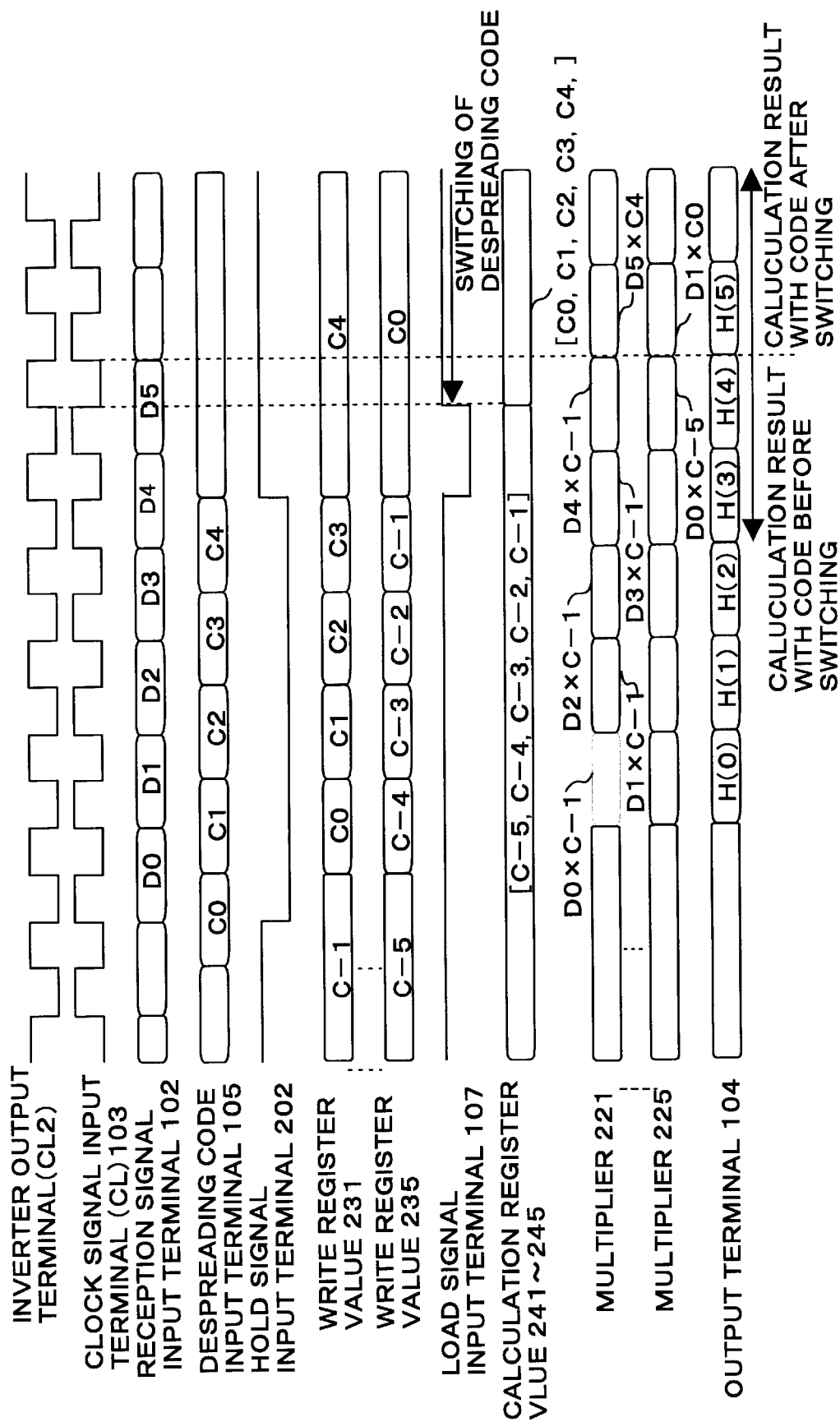
FIG. 8 is a timing diagram to explain a despreading code switching procedure in the matched filter illustrated in FIG. 7.

Processing in this embodiment configured as described above is explained with reference to the time chart illustrated in FIG. 8.

In synchronism with the second clock CL2 that inverter 310 generates by inverting phases of the first clock CL1, the despreading code sequences are input to write register 230. Then by a load signal in synchronism with a rise edge of the second clock CL2, the despreading code sequences in write register 230 are loaded in calculation register 240. As a result, the timing of despreading code inputting to calculation register 240 is always different from a rise edge of the first clock CL1 with about a-second cycle, thereby making it possible to perform successive despreading of received signals.

According to this embodiment, it is possible to perform successive despreading calculations of 6 bits digital signals synchronized with 4.096 MHz clock with the specified despreading codes using a single clock of 4.096 MHZ.

(Embodiment 4)

Figure 9:
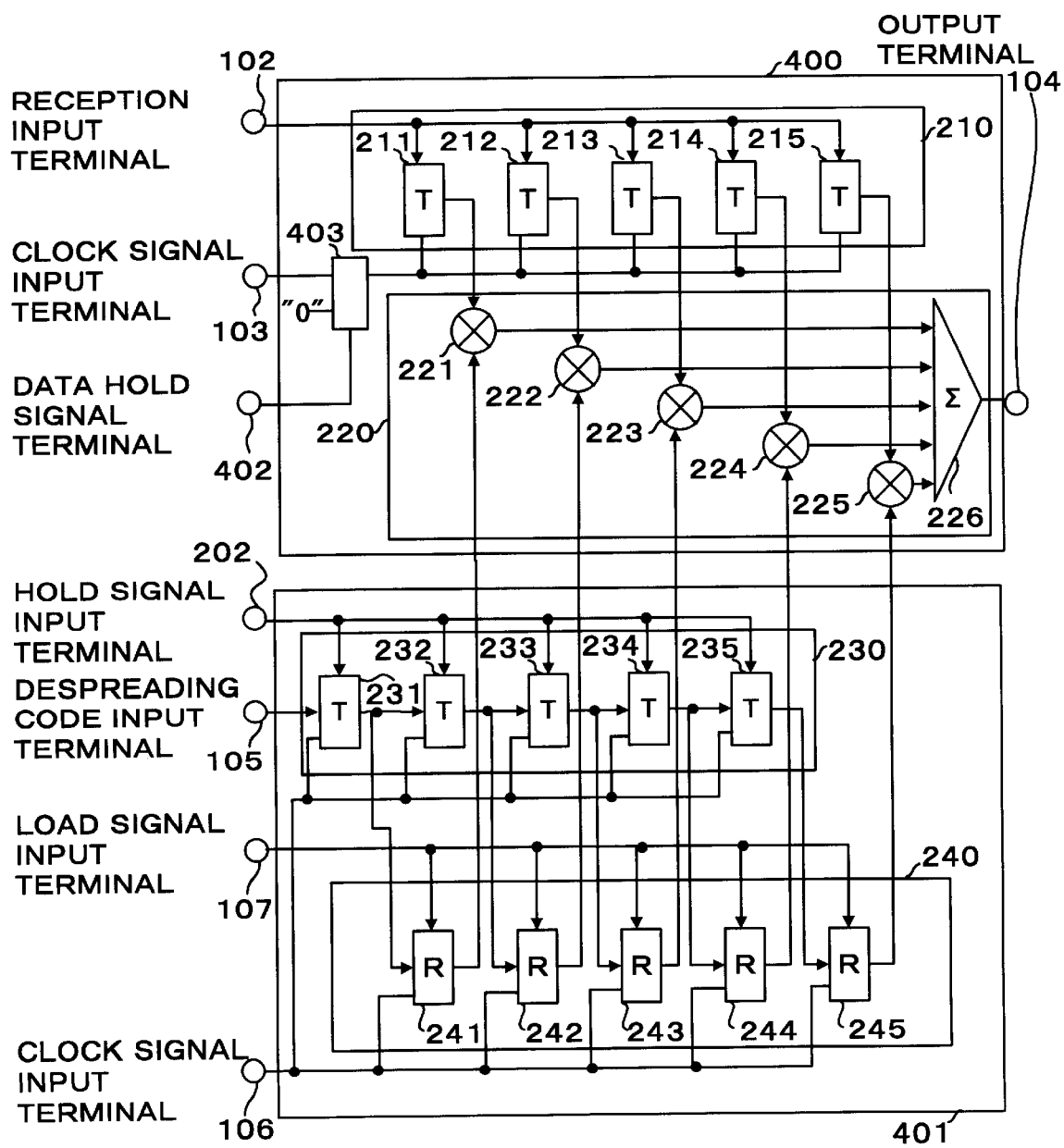
FIG. 9 is a configuration diagram of a matched filter according to Embodiment 4 of the present invention.

FIG. 9 is a circuit diagram illustrating a configuration of a matched filter according to Embodiment 4 of the present invention.

The matched filter in Embodiment 4 has the almost same configuration as that in Embodiment 2, except that selector 403 is used to hold data of shift register 210 for storing spread signals. In addition, sections having the same functions as those of the matched filter in Embodiment 2 illustrated in FIG. 5 are assigned the same symbols as those in FIG. 5 to omit the redundancy.

Despreading calculator 400 provided in the matched filter of this embodiment comprises selector 403 that controls by a signal input from data hold signal input terminal 402 whether the data are held or spread signal input from reception signal input terminal 102 are provided.

Figure 10:
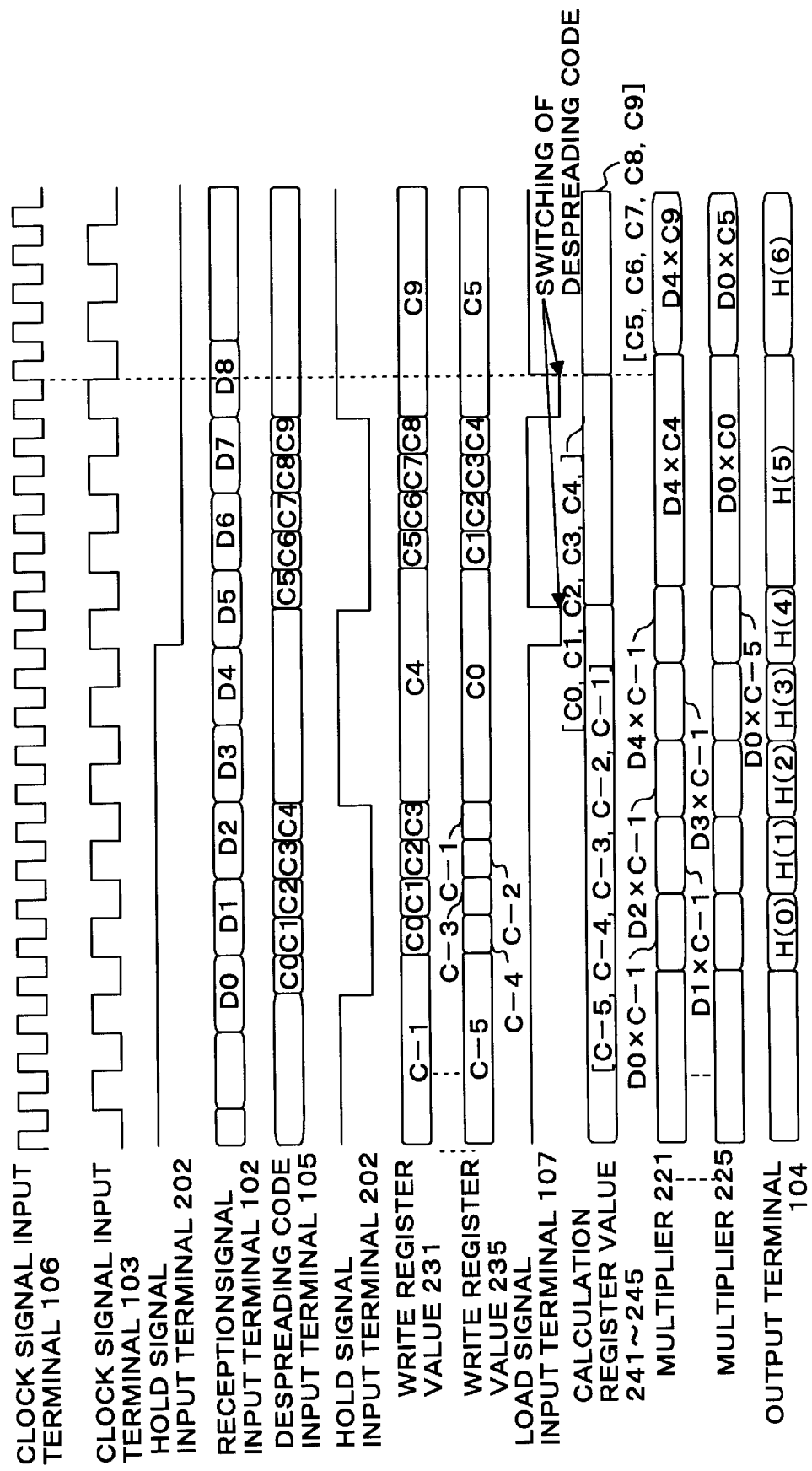
FIG. 10 is a timing diagram to explain a despreading code switching procedure in the matched filter illustrated in FIG. 9.

Processing in this embodiment configured as described above is explained with reference to a time chart illustrated in FIG. 10.

The spread signals stored in shift register 210 are held using selector 403 as described below.

When a data hold signal input from data hold signal input 402 is a low level, an output from selector is fixed at a low level, the first clock CL1 provided to shift register 210 in parallel is stopped, and the value of shift register 210 is held.

In addition, since the multiplication before and after the despreading code switching is performed in the same manner as in Embodiment 2, the rate for storing data in write shift register 240 is twice as compared with the rate for storing data in shift register 210.

Accordingly, the matched filter in this embodiment has the functions capable of holding the spread signals successively and performing the write processing in write shift register 240 at twice the rate that in shift register 210, thereby making it possible to perform calculations with a plurality of depsreading codes successively and at one-second rate.

(Embodiment 5)

Figure 11:
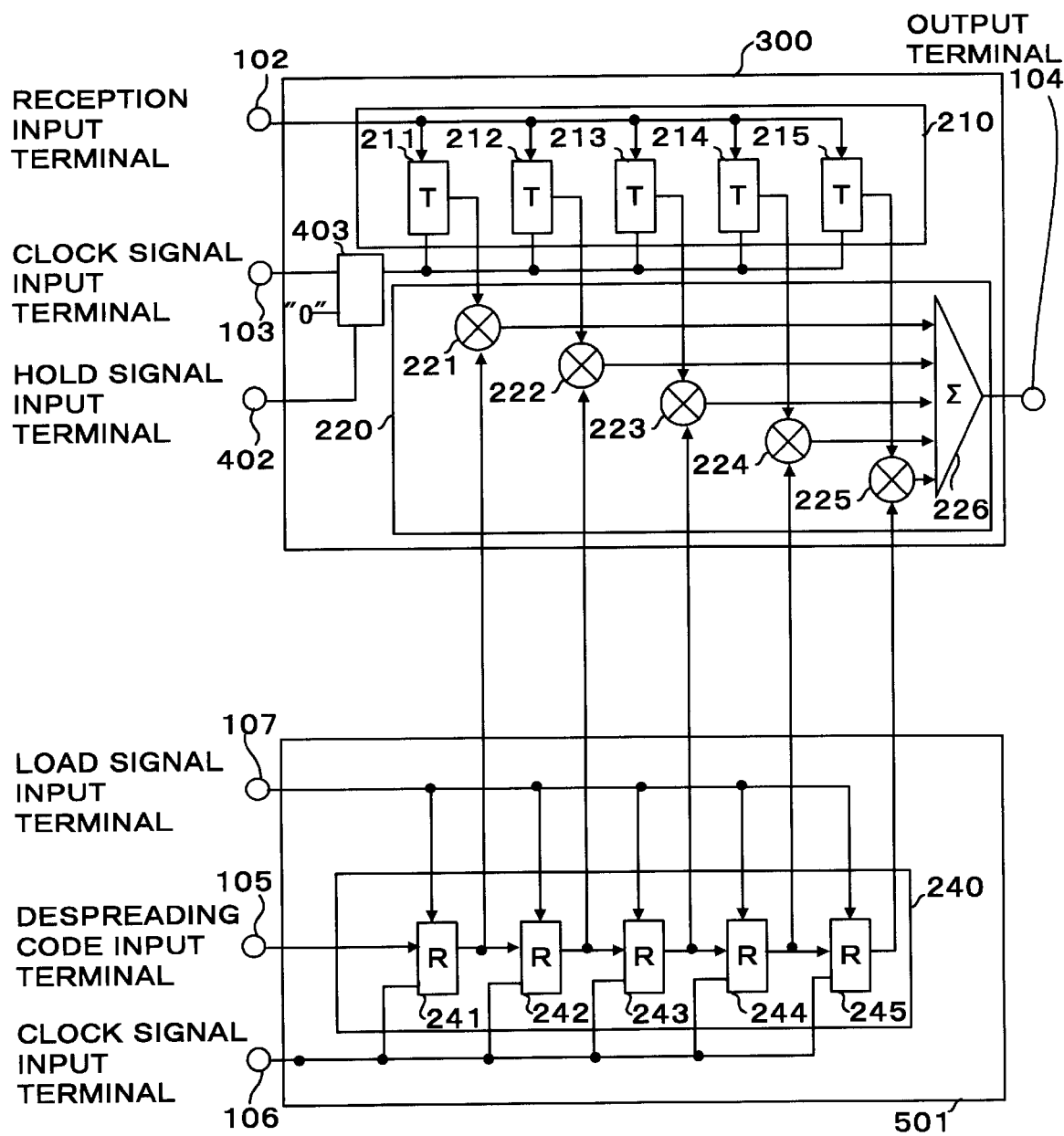
FIG. 11 is a configuration diagram of a matched filter according to Embodiment 5 of the present invention.
Figure 12:
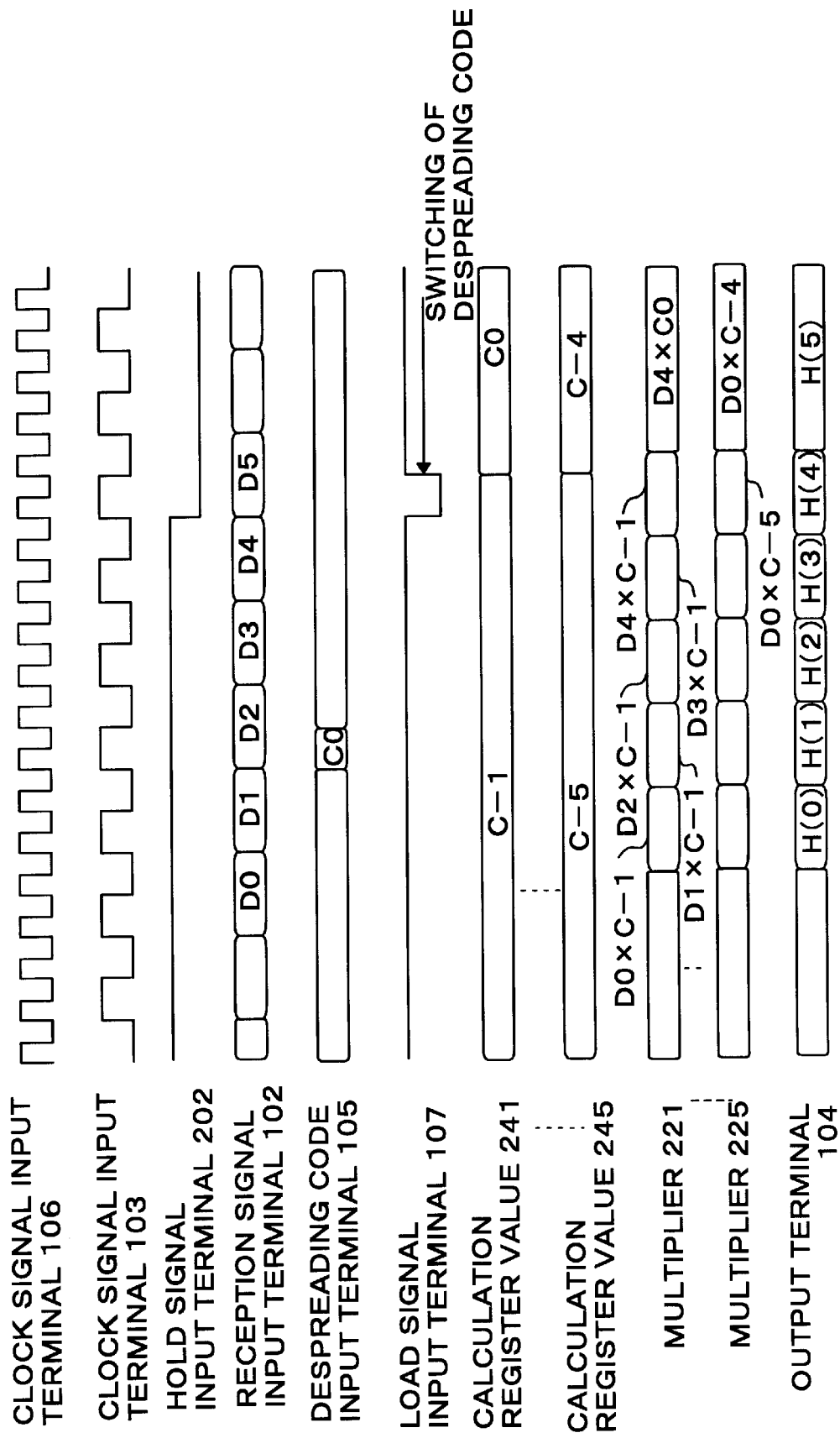
FIG. 12 is a timing diagram to explain a despreading code switching procedure in the matched filter illustrated in FIG. 11.

FIG. 11 is a circuit diagram illustrating a configuration of a matched filter according to Embodiment 5 of the present invention.

The matched filter in Embodiment 5 has the almost same configuration as that in Embodiment 4, except that a write shift register is not provided in despreading code switch 501. In addition, sections having the same functions as those of the matched filter in Embodiment 4 illustrated in FIG. 9 are assigned the same symbols as those in FIG. 9 to omit the redundancy.

In the despreading code switch 501 provided in the matched filter in this embodiment, despreading code sequences are input to despreading code input terminal 105, the second clock CL2 to provide the timing for the despreading code switching is provided to clock signal input terminal 106, and the load signal to load the switched despreading codes to despreading calculator 500 is provided to load signal input terminal 107.

This despreading code switch 501 comprises calculation register 240 for holding the despreading code sequences input from despreading code input terminal 105 to output to despreading calculation section 220 for the despreading calculation.

Calculation register 240 is composed of a plurality of flip-flops 241 to 245 that are serially coupled. The despreading code input from despreading code input terminal 105 is provided to flip-flop 241 of the first stage, and the second clock CL2 input from clock signal input terminal 106 is provided to each flip-flops 241 to 245 in parallel. The load signal is provided to each flip-flops 241 to 245 from load signal input terminal 107 in parallel, then new despreading codes are thus provided from despreading code input terminal 105.

Processing in this embodiment configured as described above is explained with reference to a time chart illustrated in FIG. 10.

The despreading code switching is performed in despreading code switch 501 in the manner as described below.

When a load signal input from load signal input terminal 107 is a low level, in synchronism with the second clock CL2 input from clock signal input terminal 106, at the time of a decay edge of the first clock CL1 in despreading calculator 300, C0 is input to shift register 240 from despreading code input terminal 105. The despreading code sequences C-4, C-3, C-2, C-1 and C0 loaded in calculation register 240 are provided to multipliers 221 to 225 in despreading calculator 300 to be used in the despreading calculation.

Thus, the load signal is the low level, in synchronism with the second clock CL2 and at a different timing from the first clock CL1 for the depsreading calculation, the despreading code C0 is loaded in flip-flop 241 of the first stage in calculation register 240, thus new despreading code sequences C-4, C-3, C-2, C-1 and C0 are set in calculation register 240.

Accordingly, in this embodiment, the despreading code sequences C-4, C-3, C-2, C-1 and C0 that are shifted by one clock phase from the despreading code sequences C-5, C-4, C-3, C-2 and C-1 previously held in calculation register 240 are loaded in calculation register 240 in synchronism with the second clock CL2 that has a twice frequency that of the first clock CL1 for the despreading calculation.

According to this embodiment, the despreading codes shifted by one clock phase are successively loaded in calculation register 240, thereby making it possible to perform calculations successively with specified despreading codes without applying wrong codes in the system requiring successive correlation detentions of despreading code having an one clock phase shift.

(Embodiment 6)

Figure 13:
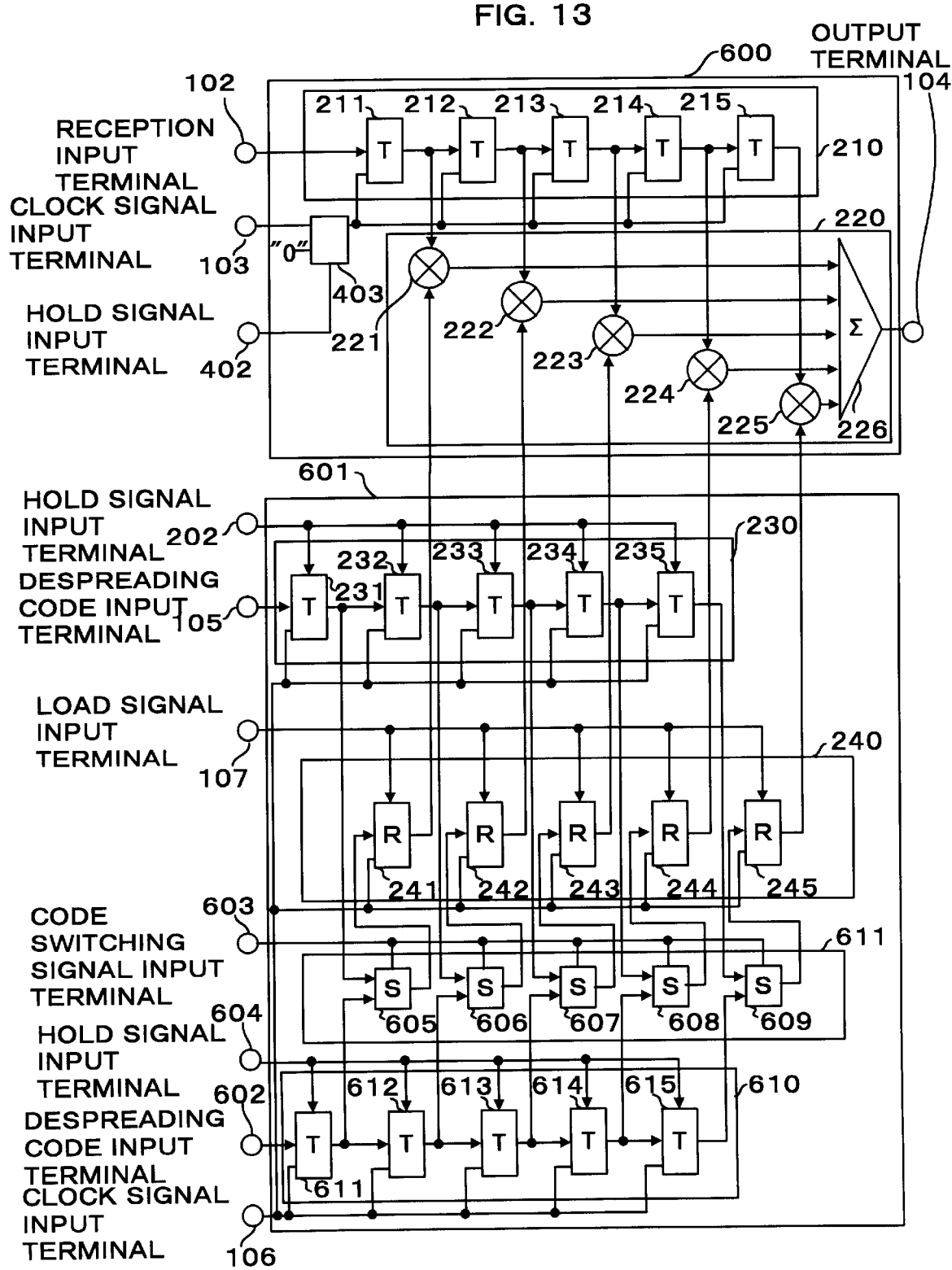
FIG. 13 is a configuration diagram of a matched filter according to Embodiment 6 of the present invention.

FIG. 13 is a circuit diagram illustrating a configuration of a matched filter according to Embodiment 6 of the present invention. The matched filter in Embodiment 6 has the almost same configuration as that in Embodiment 4, except that despreading code switch 601 includes write shift registers 230 and 610. In addition, sections having the same functions as those of the matched filter in Embodiment 4 illustrated in FIG. 9 are assigned the same symbols as those in FIG. 4 to omit the redundancy.

In despreading code switch 601, despreading code sequences are input to each of despreading code inputs 105 and 602, the second clock CL2 to provide a timing for switching the despreading code is provided to clock signal input terminal 106, the load signal to load the switched despreading code to despreading calculator 200 is provided to load signal input terminal 107, the hold signal is input to hold signal inputs 202 and 604, further a code switching signal is input to code switching signal input 603.

This despreading code switch 601 comprises in its inside write shift register 230 to hold the despreading code sequences to be provided to despreading code input terminal 105, write shift register 610 to hold the despreading code sequences to be provided to despreading code input 602, selector section 611 to switch values of write shift register 230 and write shift register 610, and calculation register 240 to which the despreading codes to be output to despreading calculation section 220 for the despreading calculation are input from selector section 611.

Write shift register 230 is composed of a plurality of flip-flops 231 to 235 that are serially coupled. The despreading code input from despreading code input terminal 105 is provided to flip-flop 231 of the first stage, and the second clock CL2 input from clock signal input terminal 106 is provided to each of flip-flops 231 to 235 in parallel. The hold signal is provided to each of flip-flops 231 to 235 from hold signal input terminal 202 in parallel. Write shift register 610 also has the same configuration.

Calculation register 240 is composed of a plurality of flip-flops 241 to 245 corresponding to the number of the selectors in selector section 611. Selector section 611 is composed of selectors 605 to 609 corresponding to the number of flip-flops in the write shift register. The code switching signal is provided from code switching signal input 603 to switch outputs from flip-flops 231 to 235 in write shift register 230 and from flip-flops 611 to 615 in write shift register 610. The despreading code corresponding to selectors 605 to 609 is respectively input to flip-flops 241 to 245, and the second clock CL2 is also input to flip-flops 241 to 245 in parallel. New despreading code is thus input from selector section 611 by the load signal.

Figure 14:
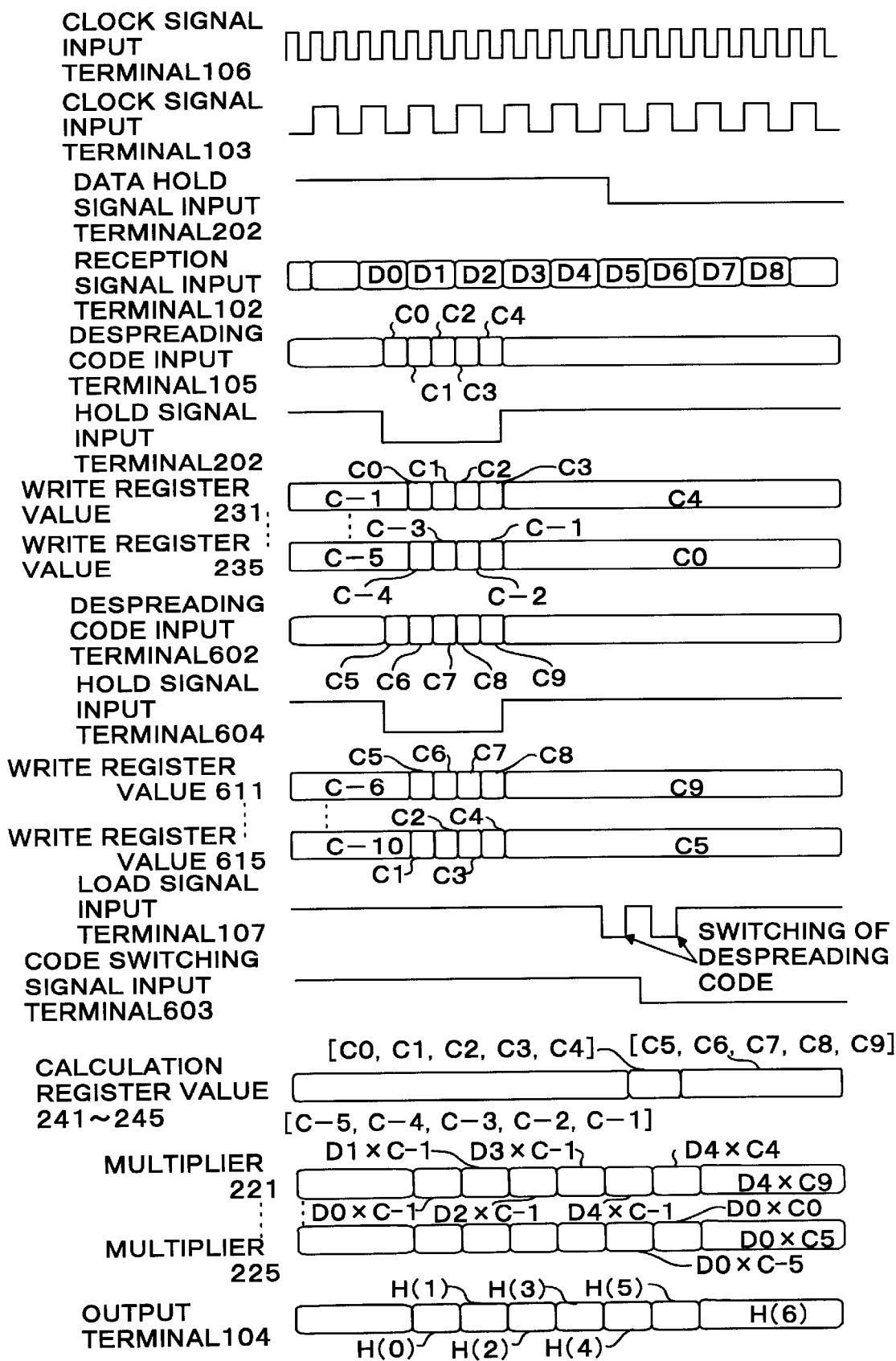
FIG. 14 is a timing diagram to explain a despreading code switching procedure in the matched filter illustrated in FIG. 13.

Processing in this embodiment configured as described above is explained with reference to a time chart illustrated in FIG. 14.

The despreading code switching is performed in despreading code switch 201 as described bellow.

When the hold signal input from hold signal input terminal 202 is a low level, in synchronism with the second clock CL2 input from clock signal input terminal 106, C0, C1, C2, C3 and C4 are sequentially input from despreading code input terminal 105 to write shift register 230.

The despreading code sequences held in write shift register 230 are thus updated in synchronism with the second clock-CL2 having a twice frequency that of the first clock CL1. In the same manner, the despreading code sequences in write shift register 610 are updated. When the code switching signal input from code switching signal input 603 is a high level and the load signal input from load signal input terminal 107 is a low level, in synchronism with the second clock CL2 and at the time of a decay edge of the first clock CL1 in despreading calculator 100, the despreading code sequences C0, C1, C2, C3 and C4 in write shift register 230 are loaded in calculation register 224. The despreading code sequences C0, C1, C2, C3 and C4 loaded in calculation register 224 are provided to multipliers 221 to 225 in despreading calculator 100 to be used in the despreading calculation. And when the code switching signal input from code switching signal input terminal 603 is a low level and the load signal input from load signal input terminal 107 is a low level, in synchronism with the second clock CL2 and at the time of a decay edge of the first clock CL1 in despreading calculator 100, the despreading code sequences C5, C6, C7, C8 and C9 in write shift register 610 are loaded in calculation register 224. The despreading code sequences C5, C6, C7, C8 and C9 loaded in calculation register 224 are provided to multipliers 221 to 225 in despreading calculator 100 to be used in the despreading calculation.

The switching of two write shift registers is thus performed by the code switching signal. Hence in synchronism with the second clock CL2 and at the time of a different timing from the first clock CL1 for the despreading calculation, the despreading code sequences in either of two write shift registers are loaded in calculation register 240.

Accordingly, in this embodiment, since two write shift registers are provided, it is possible to perform the calculations with the specified despreading codes successively in one-fourth cycle time.

(Embodiment 7)

Figure 15:
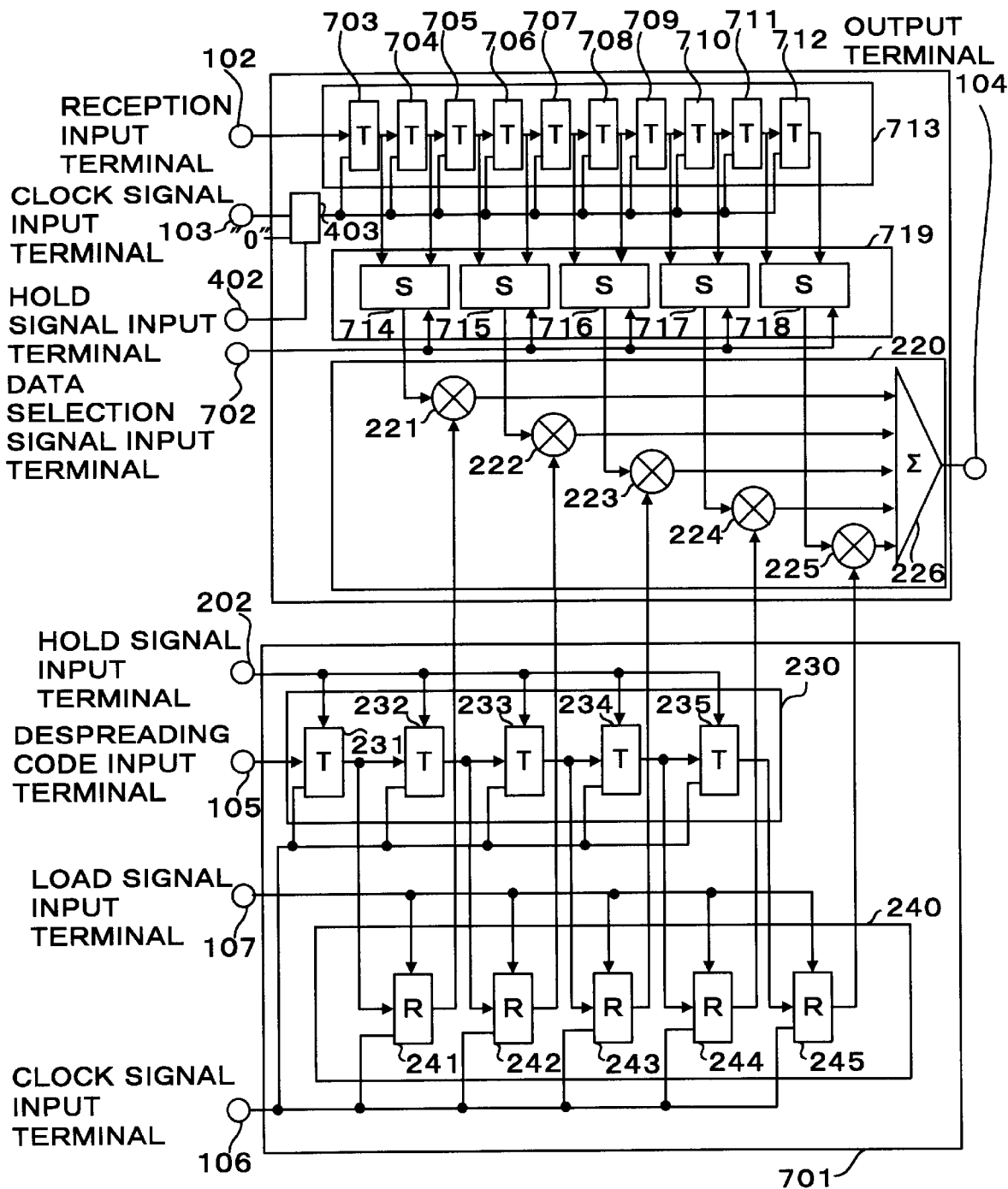
FIG. 15 is a configuration diagram of a matched filter according to Embodiment 7 of the present invention.
Figure 16:
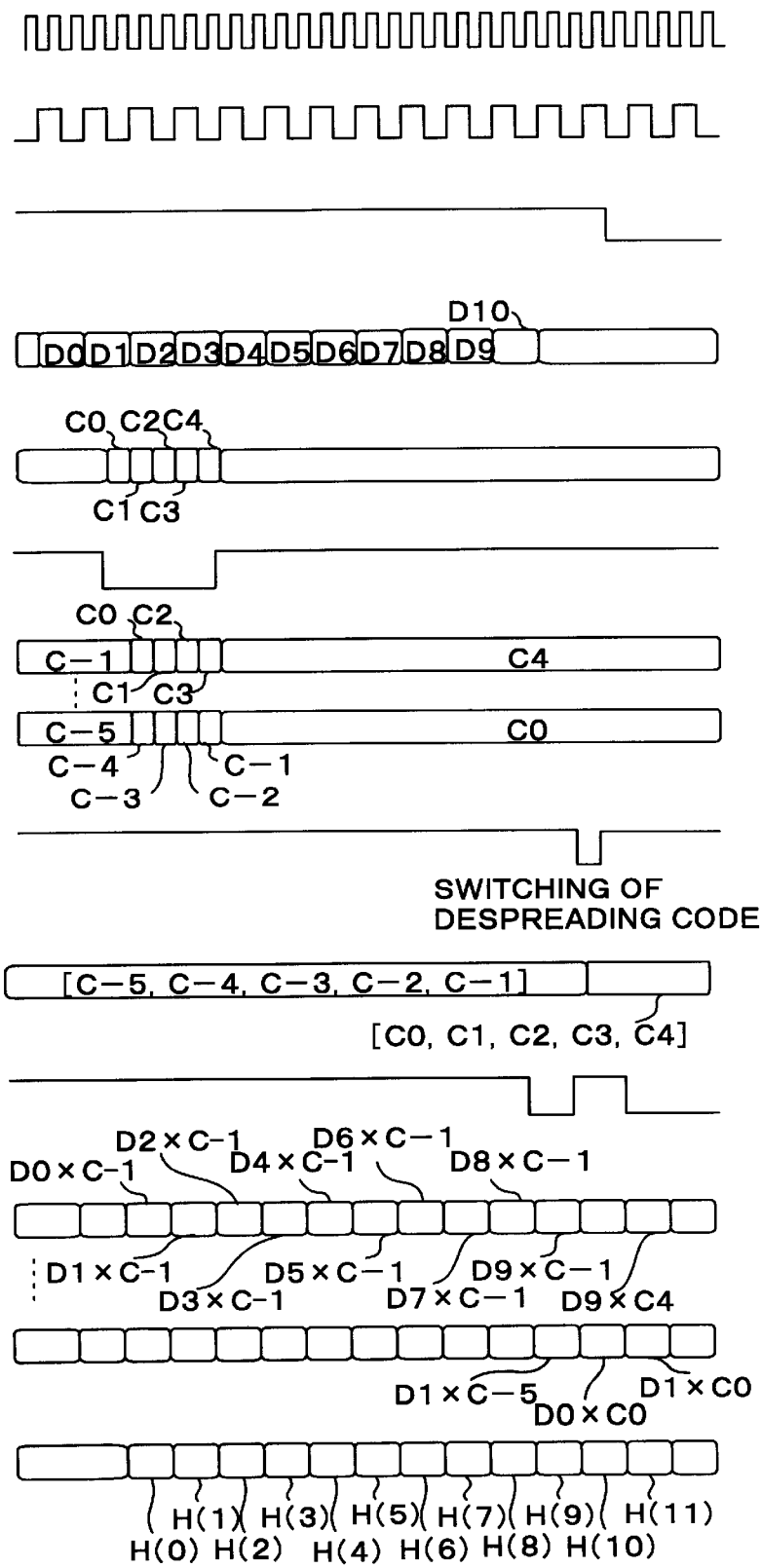
FIG. 16 is a timing diagram to explain a despreading code switching procedure in the matched filter illustrated in FIG. 15.

FIG. 15 is a circuit diagram illustrating a configuration of a matched filter according to Embodiment 7 of the present invention. The matched filter in Embodiment 7 has almost the same configuration as that in Embodiment 4, except for a shift register having a shift length capable of holding spread signals twice oversampled and a selector section to select one-second of output signals as a spread signal to be subjected to the correlation detection. In addition, sections having the same functions as those in Embodiment 4 illustrated in FIG. 11 are assigned the same symbols to omit the redundancy.

In the matched filter in this embodiment, a clock of 8.192 MHz is input to clock signal input terminal 103 in despreading calculator 700 as the first clock CL1 provided, and a clock of 16.394 MHz that is twice the frequency as the first clock CL1 is input to clock signal input terminal 106 in despreading code switch 701 as the second clock CL2.

Shift register 713 provided in despreading calculator 700 is composed of a plurality of flip-flops 703 to 712 that are serially coupled. The spread signal input from reception signal input terminal 102 is provided to flip-flop 703 of the first stage, and the first clock CL1 input from clock signal input terminal 103 is provided to each of flip-flops 703 to 712 in parallel. The spread signals twice oversampled are selected in selector section 719 to be provided to despreading calculator 220.

Processing in this embodiment configured as described above is explained with reference to a time chart illustrated in FIG. 15.

A digital signal of the first sampling data D0 is input to flip-flop 211 in synchronism with the first clock CL1, then the multiplication of the sampling data D0 by despreading code C-1 is performed in multiplier 209, and an output signal indicative of a value of D0×C-1 is output from multiplier 209.

At the next clock timing of the first clock CL1, a digital signal of the second sampling data D1 is input to flip-flop 211, and a digital signal of the first sampling data D0 is input to flip-flop 212. The sampling data D1 and D0 held in flip-flops 211 and 212 are multiplied by despreading code C-1 or C-2 respectively in corresponding multipliers 221 and 222. An output signal indicative of a value of D1×C-1 is output from multiplier 221, while an output signal indicative of a value of D0×C-2 is output from multiplier 222. The same processing is repeated until the tenth sampling data D9 are input.

Then, selector section 719 selects the odd number of twice oversampled spread signals when the data selection signal input to data selection signal input terminal 702 is a high level, selects the even number of twice oversampled spread signals when the data selection signal input to data selection signal input terminal 702 is a low level, and provides the twice oversampled spread signals to despreading calculation section 220 in time division. Therefore, it is possible to perform the despreading calculation of twice oversampled spread signals.

As described above, according to this embodiment, it is possible to perform the despreading calculation of 6 bits digital signals synchronized with 8.192 MHZ clock with the specified despreading codes successively in the improved accuracy of reception timing detection.

(Embodiment 8)

Figure 17:
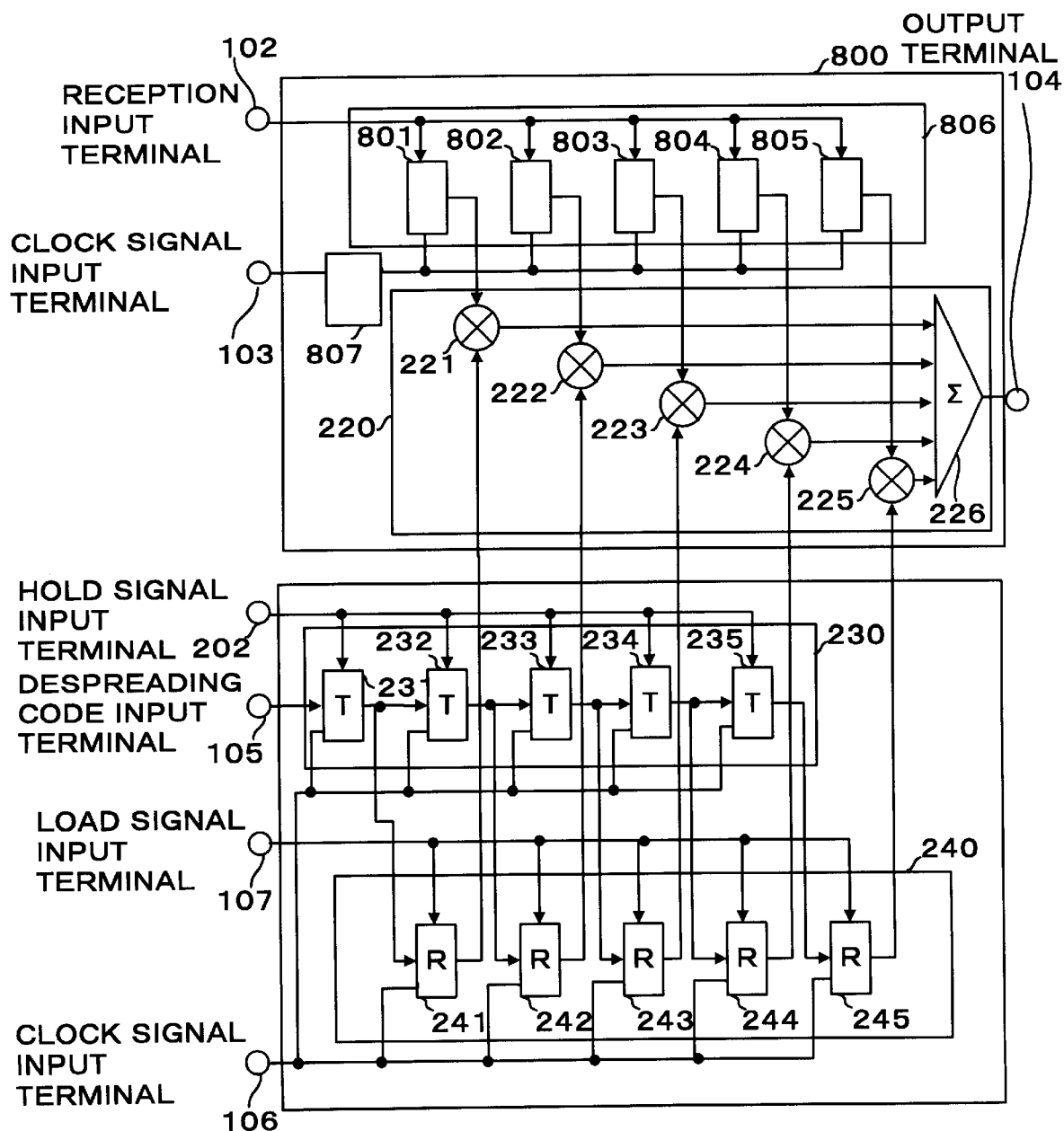
FIG. 17 is a configuration diagram of a matched filter according to Embodiment 8 of the present invention.

FIG. 17 is a circuit diagram illustrating a configuration of a matched filter according to Embodiment 8 of the present invention. The matched filter in Embodiment 8 has almost the same configuration as that in Embodiment 4, except that a memory is used to hold received signals in stead of a shift register. In addition, sections having the same functions as those in Embodiment 5 illustrated in FIG. 11 are assigned the same symbols to omit the redundancy.

In this embodiment, memory section 800 provided in despreading calculator 800 is composed of memories 801 to 805 in which parallel write/read processing is possible. An output signal of address counter 807 for counting the first clock CL1 input to clock signal input terminal 103 is provided to each of memories 801 to 805 in parallel. In addition, it is assumed that an initial state of address counter 807 is "100" indicative of the 4th address.

Figure 18:
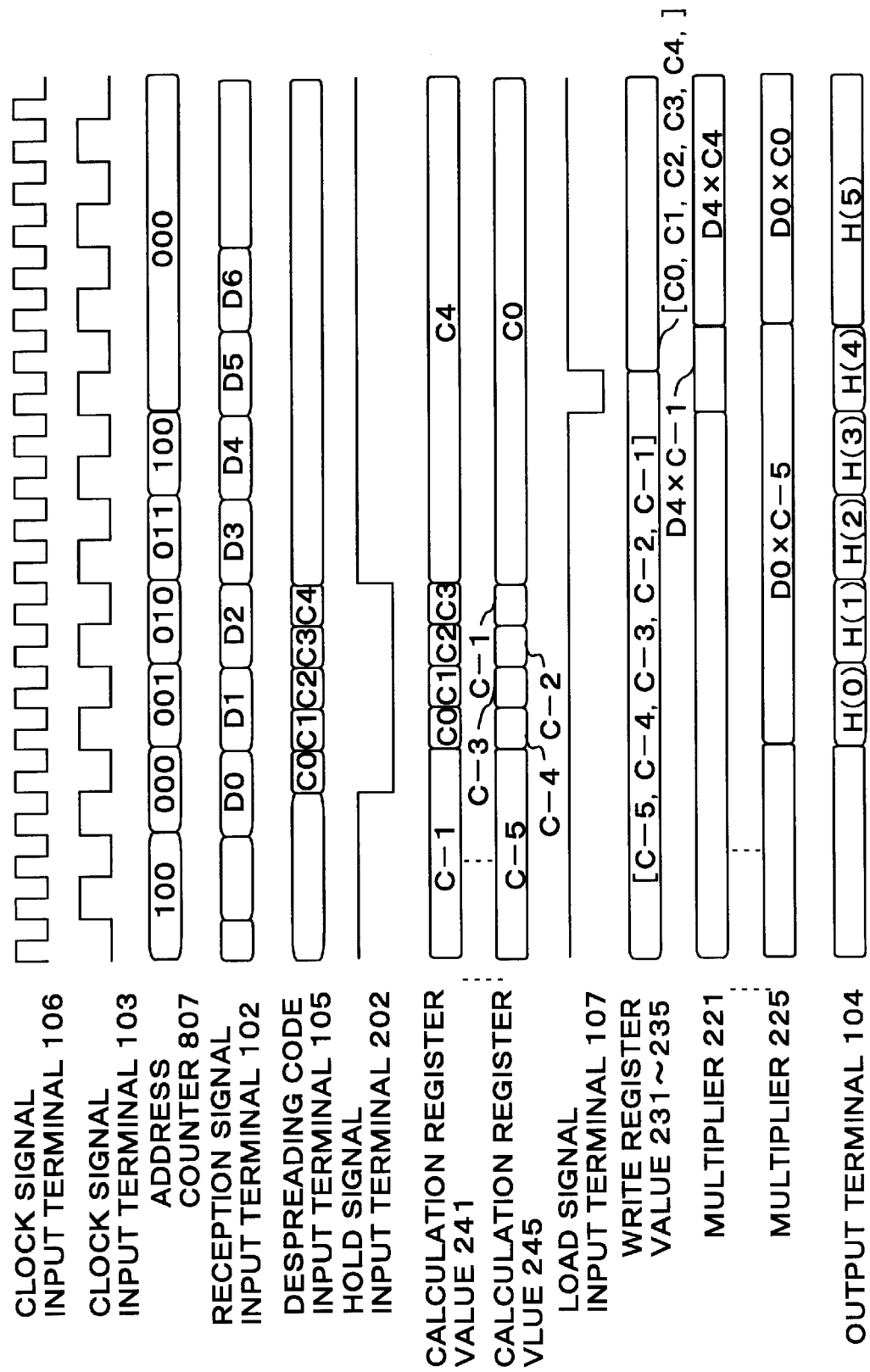
FIG. 18 is a timing diagram to explain a despreading code switching procedure in the matched filter illustrated in FIG. 17.

Processing in this embodiment configured as described above is explained with reference to a time chart illustrated in FIG. 18.

When the first clock CL1 is input to address counter 807, an output from address counter 807 becomes "000" indicative of the 0th address, and the memory 805 of the first memory in memory section 806 becomes writable state. When the second of the first clock CL1 is input to address counter 807, the output from address counter 807 becomes "001" indicative of the first address, and the memory 804 of the second memory in memory section 806 becomes writable state. Then, in the same manner as described above, in synchronism with the first clock CL1, memories 803 to 801 become writable state sequentially. Further, when the sixth of the first clock CL1 is input to address counter 807, the output from address counter 807 becomes "000" indicative of 0th address, and memory 805 of the first memory becomes writable state. Thus, the spread signals are input to five stages of memories 801 to 805 composing memory section 806 sequentially to be held in synchronism with the first clock CL1.

As a result, it is possible to hold received signals in synchronism with the first clock CL1 even in the holding section for received signals using memories, thereby making it possible to perform successive despreading calculations.

As described above, according to this embodiment, it is possible to perform successive despreading calculations with specified despreading code using the memorizing section for received signals using memories.

(Embodiment 9)

Embodiment 9 of the present invention describes about examples of the matched filters described in above-mentioned Embodiment 1 to Embodiment 8 applied in a CDMA reception apparatus.

Hereinafter, Embodiment 9 of the present invention is explained with reference to FIG. 19.

Figure 19:
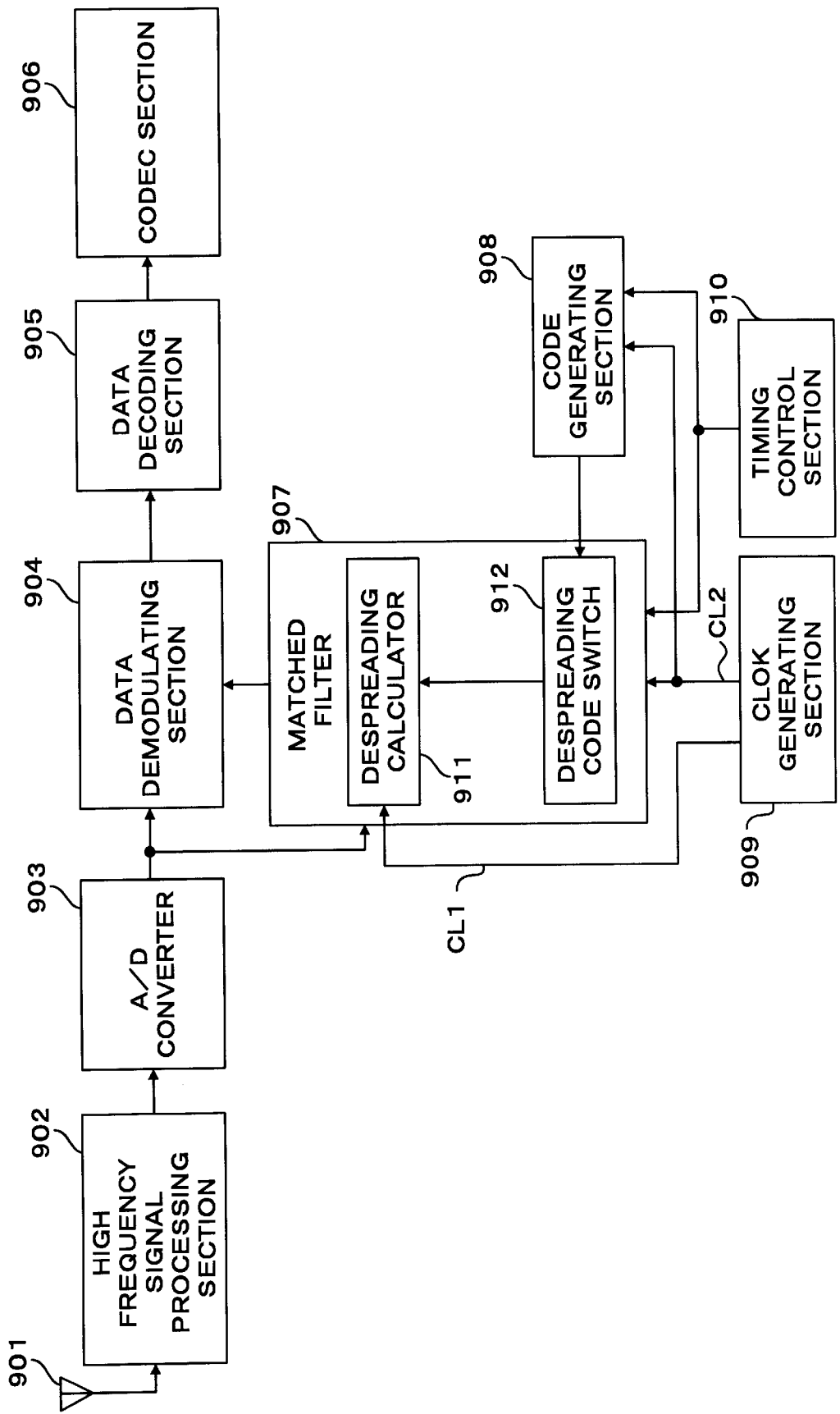
FIG. 19 is a configuration diagram of a CDMA reception apparatus according to Embodiment 9.

FIG. 19 illustrates a configuration diagram of a CDMA reception apparatus according to Embodiment 9 of the present invention. The CDMA reception apparatus of Embodiment 9 comprises reception antenna 901, high frequency signal processing section 902 for filtering and amplifying at a predetermined frequency, AD converter 903 for converting an analogue signal to a digital signal, data demodulating section 904 for demodulating received signals, data decoding section 905 for performing a decoding, CODEC section 906 for converting decoded signal to speech, matched filter for performing acquisition or hold of synchronization with a communication partner, code generating section 908 for generating despreading codes, clock signal section 909 and timing control section 910.

Matched filter 907 comprises despreading calculator 911 and despreading code switch 912. To despreading calculator 911, spread signals composed of spread digital signals are input from AD converter 903 and the first clock CL1 is input from clock generating section 909. To despreading code switch 912, a despreading code is input from code generator 908, and the second clock CL2 is input from clock generating section 909. Timing control section 910 controls a timing of despreading and other processing. Despreading calculator 911 performs despreading calculations of spread signals provided from AD converter 903 with despreading codes provided from despreading code switch 912 and, and outputs despread calculation results to data demodulating section 904, thereby resulting in the acquisition or hold of synchronization. Data demodulating section 904 data demodulates the timing result obtained from matched filter 907 to output to a data decoding section.

In addition, since matched filter 907 has the same configuration as that in Embodiment 2, it is possible to perform successive despreading with the specified despreading code without using wrong codes in despreading signals received in a reception apparatus.

According to this embodiment, it is possible to perform successive despreading with the specified despreading code in the CDMA reception apparatus including a matched filter having the same configuration as that in Embodiment 2, thereby allowing communication controls without errors.

In addition, in Embodiment 9, the case of applying the matched filter explained in Embodiment 2 to a CDMA reception apparatus is explained. However it is also preferable to apply the matched filter explained in other embodiments.

It is also preferable to apply any of the matched filters explained in either of Embodiment 1 to Embodiment 8 to a radio reception section of a base station apparatus or a mobile station apparatus that performs a mobile radio communication in a CDMA system or to a radio reception apparatus in other communication terminals.

As described above, in the present invention, it is possible to perform the successive depsreading calculations with specified despreading codes without using wrong codes in the system requiring the correlation detection with a plurality of despreading codes, which is achieved to perform the correlation detentions of input digital signals with a plurality of despreading codes by differing the processing timing of the despreading calculation and the switching timing of despreading code, thereby making it possible to integrate the circuits into LSI by synchronizing the clock of the processing timing. Further it is possible to reduce the switching time to 1/m by increasing the despreading code switching speed to m times.

This application is based on the Japanese Patent Application No.HEI9-365288 filed on Dec. 20, 1997 and No.HEI10-240302 filed on Aug. 26, 1998 each entire contents of which are expressly incorporated by reference herein.

What is claimed is:

1. A correlator for detecting a correlation of spread data with a despreading code, said correlator comprising:

a despreading calculator that despreads the spread data with the despreading code;

a code switching device that switches the despreading code at a timing differing from a calculation timing of said despreading calculator;

a first data holding device that holds said spread signal; and a second data holding device to which a load signal is provided before a switch of the spread signal being subjected to a despreading calculation in said despreading calculator, then the despreading code to be used in a next despreading calculation is loaded.

2. The correlator according to claim 1, further comprising:

a selector that switches the first clock signal to input the spread signal to said first data holding device and a data holding signal to hold the spread signal to be provided to said despreading calculator from said first data holding device, wherein said second clock signal has a frequency n times higher than a frequency of said first clock signal.

3. The correlator according to claim 1, wherein said second data holding device has a shift register composed of a plurality of flip-flops each serially coupled, the spread signal input to a first flip-flop in said shift register is output to a next flip-flop in said shift register sequentially in synchronism with the second clock signal, and each output from each flip-flop is provided to the despreading calculator as the despreading code.

4. The correlator according to claim 1, further comprising:

a plurality of shift registers to write and to which the despreading code is input sequentially in synchronism with the second clock signal; and a selection device that selects an output signal from each of said plurality of shift registers to write based on a code switching signal wherein said output signal from each of said plurality of shift registers is to be held in said second data holding device as a despreading code.

5. The correlator according to claim 1, wherein said first data holding device has a shift register having register length of m stages capable of holding m times oversampled spread signal and transferring a data synchronism with the first clock signal, and a selector for selecting a 1/m output signal as a spread signal to be subjected to a correlation detection from among each output signal from each stage of said shift register.

6. The correlator according to claim 1, wherein said first data holding device comprises a plurality of memories enabling writing and reading in parallel, and an address controlling device for controlling a write address and a read address with respect to the spread signal for said memories in synchronism with the first clock signal.

7. A correlator for detecting a correlation of spread data with a despreading code, said correlator comprising:

- a despreading calculator for despreading the spread data with the despreading code;
- a code switching device that switches the despreading code at a timing differing from a calculation timing of said despreading calculator;
- a first data holding device that holds the spread data input sequentially in synchronism with a first clock signal; and
- a second holding device that holds said despreading code, wherein said despreading calculator calculates the correlation of the spread signal held in said first data holding device with the despreading code held in said second data storing device, and said code switching device switches said despreading code based on said second clock signal of which a phase is different from that of said first clock signal.

* * * * *

UNITED STATES PATENT AND TRADEMARK OFFICE
CERTIFICATE OF CORRECTION

PATENT NO. : 6,516,020 B1 Page 1 of 1
DATED : February 4, 2003
INVENTOR(S) : N. Kurihara It is certified that error appears in the above-identified patent and that said Letters Patent is hereby corrected as shown below:

<u>Title page,</u>
Item [56], References Cited, the following U.S. PATENT DOCUMENT was omitted and should be included:
-- 5,953,364     09/14/99     Yamamoto     375/200 --.
The following FOREIGN PATENT DOCUMENTS were omitted and should be included:
-- 0886386     12/23/98     E.P.O.
   0905888     03/31/99     E.P.O.
   0773635     05/14/97     E.P.O.
   0771071     05/02/97     E.P.O.
   9-270768    10/14/97     Japan --.
The following OTHER DOCUMENT was omitted and should be included:
-- English Language Abstract of JP-270768. --.

Signed and Sealed this

Fifteenth Day of July, 2003

JAMES E. ROGAN
*Director of the United States Patent and Trademark Office*